United States Patent
Mueller et al.

(10) Patent No.: US 10,419,802 B2
(45) Date of Patent: *Sep. 17, 2019

(54) ADAPTATION LOGIC FOR VARYING A BITRATE

(71) Applicant: bitmovin GmbH, Klagenfurt (AT)

(72) Inventors: Christopher Mueller, Villach (AT); Stefan Lederer, Klagenfurt (AT); Christian Timmerer, Klagenfurt (AT)

(73) Assignee: bitmovin GmbH, Klagenfurt (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,886

(22) Filed: Nov. 30, 2016

(65) Prior Publication Data

US 2017/0188069 A1 Jun. 29, 2017

Related U.S. Application Data

(63) Continuation of application No. 13/915,531, filed on Jun. 11, 2013, now Pat. No. 9,544,352.

(51) Int. Cl.
*H04N 21/2662* (2011.01)
*H04L 29/06* (2006.01)
*H04N 21/2343* (2011.01)
*H04N 21/24* (2011.01)
*G06F 15/16* (2006.01)
*H04L 12/28* (2006.01)

(52) U.S. Cl.
CPC ......... *H04N 21/2662* (2013.01); *G06F 15/16* (2013.01); *H04L 12/28* (2013.01); *H04L 29/06027* (2013.01); *H04L 65/80* (2013.01); *H04N 21/23439* (2013.01); *H04N 21/2402* (2013.01)

(58) Field of Classification Search
CPC ......... H04N 21/2662; H04N 21/23439; H04N 21/2402; G06F 15/16; H04L 12/28; H04L 29/06027; H04L 65/80
See application file for complete search history.

(56) References Cited

U.S. PATENT DOCUMENTS

| 6,185,625 | B1 | 2/2001 | Tso et al. | |
|---|---|---|---|---|
| 7,548,948 | B2 | 6/2009 | Klemets et al. | |
| 2002/0146069 | A1* | 10/2002 | Olsen | H04L 25/0262 375/225 |
| 2003/0055995 | A1 | 3/2003 | Ala-Honkola | |

(Continued)

FOREIGN PATENT DOCUMENTS

WO 2011139305 A1 11/2011

OTHER PUBLICATIONS

"Adobe HTTP Dynamic Streaming Datasheet", Adobe Systems Incorporated, Adobe Systems Inc., 2 pages, Apr. 2010.

(Continued)

*Primary Examiner* — Azizul Choudhury
(74) *Attorney, Agent, or Firm* — Marton Ribera Schumann & Chang LLP; Hector J. Ribera

(57) ABSTRACT

A reduction in bitrate oscillation penalties is achieved by determining an oscillation measure measuring a balance of bitrate increase and bitrate decrease of the varied bitrate at which recently retrieved segments of the sequence of segments have been retrieved and setting the bitrate at which a current segment of the sequence of segments is to be retrieved depending on the oscillation measure.

14 Claims, 16 Drawing Sheets

(56) References Cited

U.S. PATENT DOCUMENTS

| | | |
|---|---|---|
| 2004/0003101 A1 | 1/2004 | Roth et al. |
| 2009/0009370 A1* | 1/2009 | Hasegawa ............ H04N 19/149 |
| | | 341/61 |
| 2010/0131671 A1 | 5/2010 | Kohli et al. |
| 2010/0268836 A1 | 10/2010 | Jabri et al. |
| 2011/0096828 A1 | 4/2011 | Chen et al. |
| 2011/0173345 A1 | 7/2011 | Knox et al. |
| 2014/0365677 A1* | 12/2014 | Mueller .................. H04L 65/80 |
| | | 709/231 |

OTHER PUBLICATIONS

"Cisco Visual Networking Index: Global Mobile Data Traffic Forecast Update, 2012-2017", White Paper, Cisco Systems, Inc., pp. 1-34, Feb. 6, 2013.

Sandvine, "Intelligent Broadband Networks, Global Internet Phenomena Report: 2H 2012", Sandvine Incorporated ULC, Revision Nov. 11, 2012, 35 pages.

Adams, M., "Optimizing Fairness of HTTP Adaptive Streaming in Cable Networks", Solution Area Media, Ericsson, 10 pages, Apr. 2012.

Ahkshabi, S., "An Experimental Evaluation of Rate-Adaptation Algorithms in Adaptive Streaming over HTTP", MMSys'11, Feb. 23-25, 2011, pp. 157-168, San Jose, CA.

Akhshabi, S et al., "An Experimental Evaluation of Rate-Adaptive Video Players over HTTP", Signal Processing: Image Communication, 27(4):271-287, 2012; available online Oct. 14, 2011.

Akhshabi, S et al., "Server-based Traffic Shaping for Stabilizing Oscillating Adaptive Streaming Players", NOSSDAV'13, Feb. 26-Mar. 1, 2013, Oslo, Norway, 6 pages.

Akhshabi, S. et al., "What Happens When HTTP Adaptive Streaming Players Compete for Bandwidth?", NOSSDAV' 12, Jun. 7-8, 2012, 6 pages, Toronto, Ontario, Canada.

De Cicco, et al., "An Experimental Investigation of the Akamai Adaptive Video Streaming", Proceedings of the 6th international conference on HCI in work and learning, life and leisure: workgroup human-computer interaction and usability engineering in USAB'10, Nov. 4-5, 2010, pp. 447-464.

El Essaili, "Quality-of-Experience driven Adaptive HTTP Media Delivery", IEEE International Conference on Communications (ICC 2013), Budapest, Hungary, Jun. 9-13, 2013, 6 pages.

Hoßfeld, T. et al., "Initial Delay vs. Interruptions: Between the Devil and the Deep Blue Sea", QoMEX 2012, Yarra Valley, Australia, Jul. 5-7, 2012, 6 pages.

Houdaille, R. et al., "Shaping HTTP Adaptive Streams for a Better User Experience", Proceedings of the 3rd Multimedia Systems Conference in MMSys '12, ACM, New York, NY, Feb. 22-24, 2012, pp. 1-9.

Kuschnig, R., "Evaluation of HTTP-based Request-Response Streams for Internet Video Streaming", Proceedings of the second annual ACM conference on Multimedia systems in MMSys '11, ACM, New York, NY, Feb. 23-15, 2011, pp. 245-256.

Le Callet, P., "Qualinet White Paper on Definitions of Quality of Experience (2012)", Technical report, European Network on Quality of Experience in Multimedia Systems and Services (COST Action IC 1003), Lausanne, Switzerland, Version 1.2, Mar. 2013, 24 pages.

Liu, C., "Rate Adaptation for Adaptive HTTP Streaming", Proceedings of the second annual ACM conference on Multimedia systems in MMSys '11, ACM, New York, NY, USA, Feb. 23-25, 2011, pp. 169-174.

Mok, R.K.P., "QDASH: a QoE-aware DASH System", Proceedings of the 3rd Multimedia Systems Conference in MMSys '12, ACM, New York, NY, Feb. 22-24, 2012, pp. 11-22.

Mueller, C., "A Proxy Effect Analysis and Fair Adaptation Algorithm for Multiple Competing Dynamic Adaptive Streaming over HTTP Clients", Visual Communications and Image Processing (VCIP), 2012 IEEE, pp. 1-6, Nov. 27-30, 2012.

Mueller, C., "An Evaluation of Dynamic Adaptive Streaming over HTTP in Vehicular Environments", Proceedings of the 4th Workshop on Mobile Video in MoVid '12, ACM, pp. 37-42, New York, NY, Feb. 24, 2012.

Mueller, C. et al., "Fair Share and Oscillation Compensating Dynamic Adaptive Streaming over HTTP", IEEE Journal of Selected Areas on Communications, pp. 1-9, Manuscript received Apr. 15, 2013.

Mueller, C., "Using Scalable Video Coding for Dynamic Adaptive Streaming over HTTP in Mobile Environments", Signal Processing Conference (EUSIPCO), 2012 Proceedings of the 20th European, pp. 2208-2212, Aug. 27-31, 2012.

Ni, P., "Flicker Effects in Adaptive Video Streaming to Handheld Devices", Proceedings of the 19th ACM international conference on Multimedia in MM '11, ACM, pp. 463-472, New York, NY, Nov. 28-Dec. 1, 2011.

Oyman, O. et al., "Quality of Experience for HTTP Adaptive Streaming Services", Communications Magazine, IEEE, 50(4):20-27, Apr. 2012.

Pantos, R. et al., "HTTP Live Streaming", Technical report, Apple Inc., Apr. 16, 2011.

Podlipnig, S. et al., "A Survey of Web Cache Replacement Strategies", ACM Comput. Surv., 35(4):374-398, Dec. 2003.

Popa, L., "HTTP as the Narrow Waist of the Future Internet", Proceedings of the 9th ACM SIGCOMM Workshop on Hot Topics in Networks in Hotnets-IX, ACM, pp. 6:1-6:6, New York, NY, Oct. 20-21, 2010.

Riiser, H. , "A Comparison of Quality Scheduling in Commercial Adaptive HTTP Streaming Solutions on a 3G Network", Proceedings of the 4th Workshop on Mobile Video in MoVid '12, ACM, pp. 25-30, New York, NY, Feb. 24, 2012.

Riiser, H. et al., "Video Streaming Using a Location-based Bandwidth-Lookup Service for Bitrate Planning", ACM Trans. Multimedia Comput. Commun. Appl., 8(3):24:1-24:19, Jul. 2012.

Sanchez, Y. et al., "iDASH: Improved Dynamic Adaptive Streaming over HTTP using Scalable Video Coding", Proceedings of the second annual ACM conference on Multimedia systems in MMSys '11, pp. 257-264, New York, NY, Feb. 23-25, 2011.

Sieber, C. et al., "Implementation and User-centric Comparison of a Novel Adaptation Logic for DASH with SVC", IFIP/IEEE International Workshop on Quality of Experience Centric Management (QCMan), 6 pages, Ghent, Belgium, May 27-31, 2013.

Sodagar, I., "The MPEG-DASH Standard for Multimedia Streaming Over the Internet", IEEE MultiMedia, 18(4):62-67, Nov. 15, 2011.

Stockhammer, T., "Dynamic Adaptive Streaming over HTTP: Standards and Design Principles", Proceedings of the second annual ACM conference on Multimedia systems in MMSys '11, ACM, pp. 133-144, New York, NY, Feb. 23-15, 2011.

Stockhammer, T., "TS 26.247 Transparent End-to-End Packet-Switched Streaming Service (PSS)", Progressive Download and Dynamic Adaptive Streaming over HTTP, Technical report, 3GPP, originally published Jun. 2011, updated Jul. 2012.

Summers, J. et al., "To Chunk or Not to Chunk: Implications for HTTP Streaming Video Server Performance", NOSSDAV'12, Jun. 7-8, 2012, 6 pages, Toronto, Ontario, Canada, Jun. 7-8, 2012.

Timmerer, C. et al., "Dynamic adaptive streaming over HTTP: from content creation to consumption", Proceedings of the 20th ACM international conference on Multimedia in MM '12, ACM, 1533-1534, New York, NY, Oct. 29-Nov. 2, 2012.

Wang, B. et al., "Multimedia Streaming via TCP: An Analytic Performance Study", ACM Trans. Multimedia Comput. Commun. Appl., 4(2):16:1-16:22, Oct. 10-16, 2004.

Wei, P., "Video Adaptation Proxy for Wireless Dynamic Adaptive Streaming over HTTP", Packet Video Workshop (PV), 2012 19th International, pp. 65-70, May 10-11, 2012.

Zambelli, A., "IIS Smooth Streaming Technical Overview", Microsoft Silverlight, Windows Server Internet Information Services 7.0 Microsoft Corporation, pp. 1-17, Mar. 2009.

* cited by examiner

ADAPTATION LOGIC FOR VARYING A BITRATE

CROSS-REFERENCE TO RELATED APPLICATIONS

This application is a continuation of U.S. patent application Ser. No. 13/915,531, filed Jun. 11, 2013, which is incorporated herein in its entirety by this reference thereto.

DESCRIPTION

The present application is related to an adaptation logic for varying a bitrate at which segments of a sequence of segments of a time-varying content are to be retrieved.

BACKGROUND

The transport of information content such as multimedia content over the Internet has gained momentum and entered our daily lives, whether it be a major live event or on-demand access. For example, we see people accessing live sport events or watching their favorite TV series on a plethora of devices ranging from high-resolution, well-connected TV sets to smart phones with limited display and network capabilities. All of these use cases have something in common, namely the content is delivered over the Internet and on top of the existing infrastructure. In general, the amount of video traffic is growing tremendously, specifically for mobile environments (e.g., WiFi, 3/4G, smart phones, tablets) [4, 25], and the existing Hypertext Transfer Protocol (HTTP) infrastructure has become an important driver [20] for this type of application despite it is mainly deployed over the Transmission Control Protocol (TCP) [31].

The advantage of using HTTP is that it is client-driven and scales very well, thanks to its stateless design. Furthermore, the delivery of multimedia content over HTTP exploits existing infrastructures initially deployed for Web traffic such as servers, proxies, caches, and content distribution networks (CDNs). Additionally, it typically does not cause any firewall or network address translation (NAT) issues, which was the main reason for the Realtime Transport Protocol (RTP) not being widely adopted. Finally, the usage of HTTP allows for a receiver/client-driven approach—in contrast to a sender/server-driven approach—without the need for an explicit adaptation loop (feedback channel). Such a client-driven approach further increases scalability and enables flexibility as usually the client or receiver knows its context best.

The basic concept of todays' HTTP-based multimedia streaming solutions is to provide multiple versions of the same content (e.g., different bitrates), chop these versions into small segments (e.g., two seconds), and let the client decide which segment (of which version) to download next, based on its context (e.g., bandwidth). Typically, the relationship between the different versions is described by a manifest, which is provided to the client prior to the streaming session.

Although we see many deployments of such services, the multimedia streaming over HTTP is mainly based on proprietary industry solutions such as Adobes' HTTP Dynamic Streaming (HDS) [1], Apples' HTTP Live Streaming (HLS) [18], and Microsofts' Smooth Streaming [32]. Thus, interoperability is limited but with ISO/IEC MPEG Dynamic Adaptive Streaming over HTTP (DASH) a standardized solution—based on 3GPP's Adaptive HTTP Streaming (AHS) [29]—is available. DASH specifies representation formats for both the manifest and segments [27, 28]. Supported segment formats are the MPEG-2 transport stream (M2TS) and ISO base media file format (ISOBMFF) and for the manifest, DASH defines the XML-based Media Presentation Description (MPD) representing the data model, which is aligned with existing, proprietary solutions, i.e. provide multiple versions of the same content—referred to as representations—, chop the content into time-aligned segments to enable seamless switching between different representations, and enable the client to request these segments individually based on its current conditions. The standard provides a specification only for the MPD and segment formats, respectively. It deliberately excludes end-to-end system aspects and client implementation details, which are left open for industry competition. Hence, DASH as a standard may be considered as an enabler to build such systems [30].

The most changeling part of a DASH client implementation is the component that determines which segment to download next. This component is often referred to as adaptation logic. After receipt of the MPD, it basically analyzes the available representations (e.g., bitrates, resolutions) given the current context (e.g., bandwidth, display size) and starts downloading the segments accordingly. In case the context changes (e.g., due to a drop of the available bandwidth), the client may switch to another representation that is suitable for the new context. The actual switching is typically done at segment boundaries and, in general, the behavior of the adaptation logic has a direct influence on the system performance. The system performance depends on a number of metrics which can be both of objective and subjective nature. The former mainly reflects the Quality of Service (QoS) whereas the latter is often associated with the Quality of Experience (QoE) [10]. Additionally, in large-scale deployments, multiple clients may compete with each other and may introduce unwished issues, specifically when proxies/caches are deployed, which is often the case in combination with CDNs.

Early deployments of HTTP streaming use progressive download where the client opens a TCP connection to a server and progressively downloads the multimedia content. As soon as enough data is available on the client, the client could eventually start with the decoding and rendering respectively. However, in case of bandwidth fluctuations, clients cannot react which is typically followed by service interruptions, also referred to as stalls. Probably one of the first adaptive HTTP streaming solutions employed an explicit adaptation loop—inspired by RTP-based streaming—where clients perform bandwidth measurements and push the information towards the server. The server analyzes these reports and modifies the progressive download session on-demand [5]. Additionally, various other industry solutions exist as already mentioned above, each following the same principles that led to the standardization of DASH but with some (minor) differences in terms of manifest and segment formats.

As a consequence of the work on DASH, many papers evaluate DASH and/or existing approaches in simulated environments [3] or based on bandwidth traces [15, 22] while others focus on the adaptation logic itself [11, 14, 23]. For example, Liu et al. [11] describe a rate adaptation algorithm for adaptive HTTP streaming. Riiser et al. [23] suggest a location-based bandwidth-lookup service to perform bandwidth estimation for adaptive video streaming. Mueller et al. [14] show an improved adaptation logic experimenting with an exponential buffer model. While these papers provide interesting insights into the behaviour of existing approaches, results are preliminary and experimental.

Another important aspect of DASH-like systems is the QoE. Oyman et al. describes a system approach enabling QoE for adaptive HTTP streaming services [17] which, in fact, focuses on QoS metrics like HTTP request/response transactions, representation switch events, and average throughput standardized as part of 3GPP AHS [29]. QDASH [12] describes QoE-aware DASH system based on bandwidth measurements and subjective quality assessments while Sieber et al. proposes a user-centric DASH algorithm specifically designed for scalable video coding [26]. In practice, however, most prominent QoE metrics are initial (or start-up) delay and service interruptions (or stalls), respectively, where Hoßfeld et al. reveals that stalls shall be avoided at all in favor of start-up delays [7]. Another study investigates the QoE impact of the frequency and amplitude of quality switching events (flickering) for different content types showing that amplitude is dominant over frequency [16].

Proxy-based approaches may perform traffic shaping towards multiple clients [8] while others prefer server-based traffic shaping to stabilize oscillating clients [2]. Additionally, on-demand rate adaptation [21] and request re-writing [6] are other proxy-based solutions but do not take into account the issue when clients compete for bandwidth. The caching efficiency of DASH in combination with scalable video coding is shown in [24] and a model for the achievable throughput including TCP friendliness is described in [9]. Finally, Mueller et al. [13] investigates negative effects of a proxy and suggests an adaptation logic with certain countermeasures against proxies and their fouling of the bandwidth estimation, for example.

Dynamic adaptive streaming over HTTP allows for a flexible and scalable deployment of media ecosystems [3, 15, 22, 27, 28, 30] as the client encapsulates the entire streaming logic and no centralized controller is needed, also thanks to the stateless design of HTTP. Additionally, this kind of streaming approach enables the reuse of the already deployed Internet infrastructure comprising proxies, caches, and CDNs. However, the immanent nature of this ecosystem, which enables switching between individual quality levels without a centralized controller, may also introduce drawbacks. Problems may occur when multiple clients compete for bandwidth in a DASH-like streaming ecosystem.

The general assumption that TCP will accommodate the case when multiple clients compete for bandwidth is devitalized in [2, 13] where clients begin to oscillate, specifically by continuously switching between different quality levels. In particular, Akshabi et al. [2] propose a server-based solution to mitigate the oscillation effect but eliminates some major benefits such as the stateless design and the usage of ordinary HTTP servers. Furthermore, in a large-scale deployment where clients may request segments from multiple sources (servers, proxies, CDN nodes), the adoption of a server-based solution increases deployment costs and decreases scalability as segment sources need to exchange additional information about the oscillation state. In comparison, Mueller et al. [13] identify client oscillations in conjunction with proxy caches by double checking bandwidth estimates prior to bitrate increase decisions. They propose a client-centric approach that does not require any modifications on the existing infrastructure.

However, up to now there is no satisfying solution for setting, in a varying manner, the bitrate so as to avoid quality degradations due to bitrate oscillations, the solution not necessitating any central control and not being able to address any kind of oscillation.

It would be favorable to have an adaptation logic leading to less deficiency due to bitrate oscillations.

SUMMARY

In accordance with embodiments, an adaptation logic for varying a bitrate at which segments of a sequence of segments of an information content are to be retrieved, comprises an oscillation measure determiner configured to determine an oscillation measure measuring a balance of bitrate increase and bitrate decrease of the varied bitrate at which recently retrieved segments of the sequence of segments have been retrieved and a setter configured to set the bitrate at which a current segment of the sequence of segments is to be retrieved depending on the oscillation measure.

It is a basic finding of the present application that a reduction in bitrate oscillation penalties may be achieved by determining an oscillation measure measuring a balance of bitrate increase and bitrate decrease of the varied bitrate at which recently retrieved segments of the sequence of segments have been retrieved and setting the bitrate at which a current segment of the sequence of segments is to be retrieved depending on the oscillation measure.

In accordance with an embodiment, the oscillation measure is determined by computing a measure for a deviation between a weighted sum of a measure of a bitrate change strength at bitrate change events of the varied bitrate at which the recently retrieved segments of the sequence of segments have been retrieved, at immediately following segments of the sequence of segments, without taking the bitrate change direction into account, and the weighted sum of the measure of the bitrate change strength at the bitrate change events at the immediately following segments of the sequence of segments taking the bitrate change direction into account. This way of computing the oscillation measure leads to a high stability of the oscillation detection. The oscillation measure thus computed has a high sensitivity as merely bitrate change events are taken into account. Moreover, the oscillation measure thus computed shows a high selectivity for bitrate oscillations, as merely the deviation between weighted sums is computed which are the same except for the signs of the addends of the weighted sums each representing a measure of a bitrate change strength at a respective bitrate change event, the sign depending on the bitrate change direction of the respective bitrate change event, i.e. whether the bitrate decreases or increases between the respective pair of immediately following segments. Optionally, the oscillation measure determiner may determine the oscillation measure thus computed with respect to the bitrate change events within a window of a number of recently received segments which number varies in time, or with respect to windows of different numbers of recently received segments, thereby addressing different sources of bitrate oscillations leading to different oscillation rates. For example, bitrate oscillations at constant network environmental conditions may occur at an oscillation rate differing from bitrate oscillations caused by competing network clients. An adaptation of the evaluation window within which the bitrate change events used for the computation of the oscillation measure lie, enables to increase the sensitivity for a certain type of oscillation source.

In accordance with a further embodiment of the present application, the adaptation logic comprises a presetter which preliminarily sets the bitrate at which the current segment is to be retrieved using a first manner which depends on a buffer fill status of a buffer buffering the sequence of segments and/or a measure measuring a retrieval throughput at which the sequence of segments are retrieved, wherein a compensator of the adaptation logic is configured to operate in a normal mode so as to survey the oscillation measure, and depending on the surveillance, as long as the oscillation measure keeps below a predetermined oscillation threshold, leave the preliminarily set bitrate unamended so as to become the finally set bitrate, and as soon as the oscillation measure exceeds the predetermined threshold, enter the deoscillating mode. In the deoscillating mode, however, the compensator temporarily sets the bitrate at which the current and subsequent segments of the sequence of segments are to be retrieved, using a second manner which leads to less variations of the bitrate than compared to the first manner. For example, the compensator could, in the deoscillating mode, overrule the presetting or completely substitute the presetter preliminarily until re-entering the normal mode. In this manner, the concept of adaptation logic operation in accordance with these embodiments may easily be transferred into existing adaptation logic implementations, namely merely by adding the compensator.

BRIEF DESCRIPTION OF THE DRAWINGS

Advantageous implementations of the present invention are the subject of some of the dependent claims and preferred embodiments of the present application are outlined in detail below with regard to the figures, among which:

DETAILED DESCRIPTION

Figure 1:
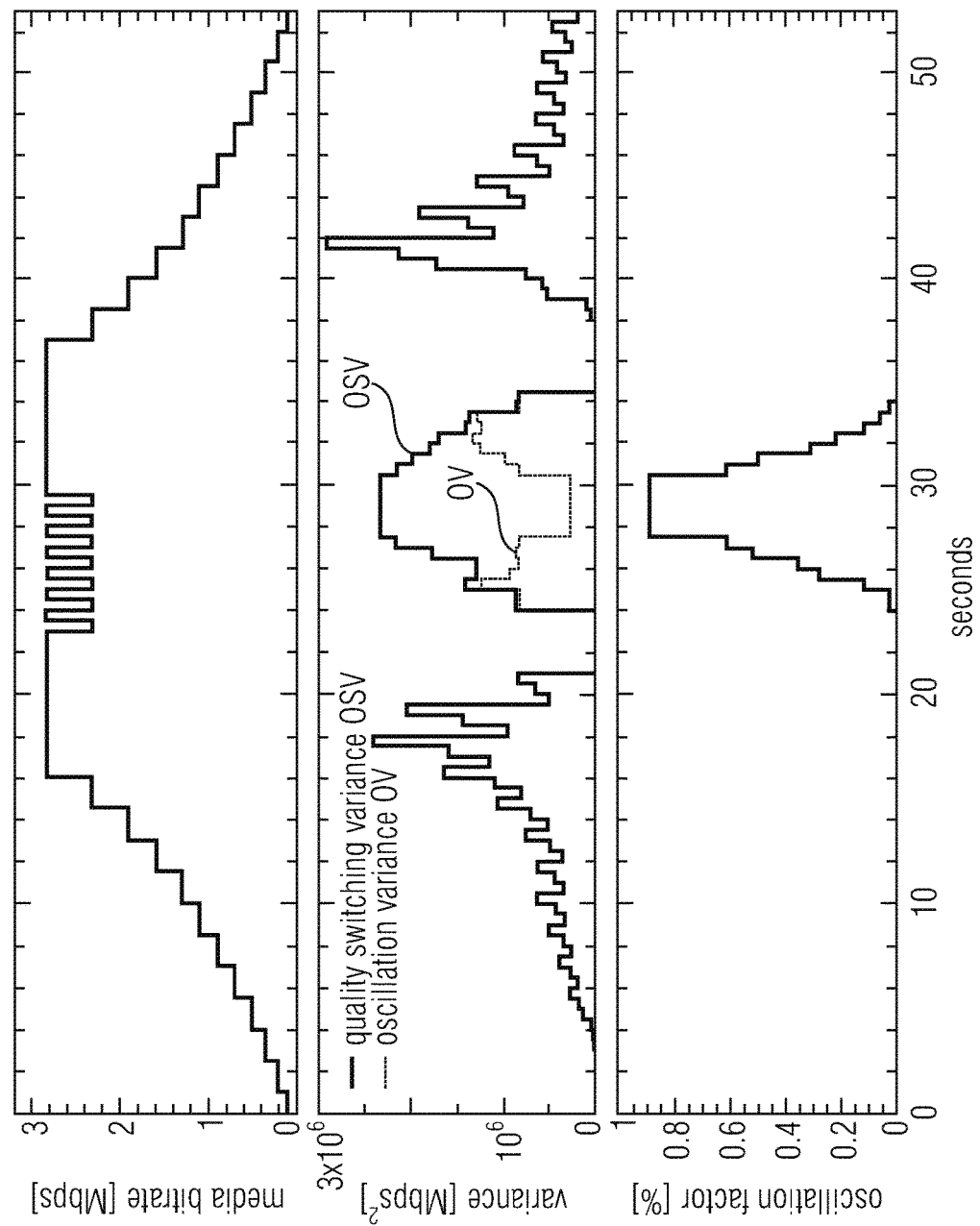
FIG. 1 shows graphs illustrating the oscillation detection based on a predefined adaptation behavior.

Before starting with the description of certain embodiments of the present application, it should be noted that same refer to "media content" as an object of the bitrate varying transmission merely for illustration purposes, although all these embodiments may easily transferred onto other sort of information content as well.

The embodiments described below provide adaptation logics that enable fair streaming in scenarios where multiple clients compete for bandwidth. Wherever oscillations in such scenarios occur, oscillations get even worse if caches are involved. The embodiments outlined below, however, alleviate this problem. The embodiments outlined below compensate for bitrate oscillations while adapting dynamic context changes and maximizing link utilization (throughput) as well as maintaining smooth streaming, i.e. avoiding stall. Moreover, the embodiments outlined below are purely client-centric and are able to work over the top without modifying the underlying infrastructure.

While related work in this field was described in the introductory portion of the specification of the present application, an introduction of the problem associated with bitrate oscillations is described further herein below. To be more specific, the various scenarios which lead to bitrate oscillations are presented first, and then embodiments are described for an adaptation logic suitable for avoiding the negative effects of such bitrate oscillations.

A. Receiver-Driven Adaptation Algorithms

For use cases where multiple clients compete for bandwidth the situation is similar as outlined in the previous subsection when the available quality levels do not fit exactly the throughput. Clients that tend to a buffer overrun and, as a consequence, have to intermediately stop the download introduce a so-called ON/OFF behavior. The same ON/OFF behavior is observed in case the available bandwidth is much higher than the best-available quality level or when multiple clients compete for bandwidth which ultimately leads to oscillation [2]. For example, in case one clients pauses the streaming process, another client may consequently measure a higher throughput followed by a representation switch to a higher quality level. If the former client resumes the streaming process, the bandwidth is again shared causing the other client to switch back to the initial quality level. In this context, the pausing and resuming of the streaming process is referred to as ON/OFF which leads to frequent oscillations as it happens on a per segment basis in DASH-like scenarios.

B. Multiple Clients Competing for Bandwidth

Media ecosystems based on the concept behind DASH assume to facilitate the existing network infrastructure which may also include (transparent) Web caches intercepting the HTTP requests and responses in the same way as for ordinary Web traffic. These caches operate on a given strategy and most prominent strategies are based on the temporal locality such as Least Recently Used (LRU), Least Frequently Used (LFU), etc. but others may be deployed also [19]. As a consequence the adaptive behavior of the clients influence the state of caches while utilizing them which implies that switching between quality levels may lead to a different throughput measurements depending on the distribution of the corresponding segments among servers and caches. Therefore, adaptation algorithms based on throughput measurements which do not take this concept of locality into account may suffer from oscillations [13]. Please note that this issue mainly concerns caches which is in contrary to CDNs where segments are distributed in a managed fashion following a predefined policy. However, also CDNs may comprise legacy caches as adaptive HTTP streaming is deployed over the top.

C. Caching Issues

Media ecosystems based on the concept behind DASH assume to facilitate the existing network infrastructure which may also include (transparent) Web caches intercepting the HTTP requests and responses in the same way as for ordinary Web traffic. These caches operate on a given strategy and most prominent strategies are based on the temporal locality such as Least Recently Used (LRU), Least Frequently Used (LFU), etc. but others may be deployed also [19]. As a consequence the adaptive behavior of the clients influence the state of caches while utilizing them which implies that switching between quality levels may lead to a different throughput measurements depending on the distribution of the corresponding segments among servers and caches. Therefore, adaptation algorithms based on throughput measurements which do not take this concept of locality into account may suffer from oscillations [13]. Please note that this issue mainly concerns caches which is in contrary to CDNs where segments are distributed in a managed fashion following a predefined policy. However, also CDNs may comprise legacy caches as adaptive HTTP streaming is deployed over the top.

The following describes metrics which may be used as an input to an adaptation logic in order to detect issues as highlighted above. Each metric can be seen as an individual tool that characterizes the adaptation or download process in a specific manner. We show how to combine these tools to efficiently detect and characterize oscillation and quality switching behavior in a way that allows for a smooth balancing of the streaming session. In the following, we define the metrics clustered depending on whether they are specific to adaptation, throughput, caching, and buffer status. They serve to more easily understand the following embodiments.

The metrics are defined for a given time window comprising a set of segments s with bitrate θ of length t seconds denoted by $\Delta=\{(\theta_i,t_i), (\theta_{i+1},t_{i+1}), \ldots, (\theta_{j-1},t_{j-1}), (\theta_j,t_j)\}$ with i, j∈N, and i<j. Hence, our metrics may be applied on a sliding window over recently retrieved segments and support variable segment length which is also supported by DASH.

A. Adaptation Specific

Equation 1 defines the mean μ of the recently retrieved segments as the average calculated from the media bitrate of segments $\theta_k$ and the length of each segment $t_k$. The size of the window may be adjusted with the parameters i and j, which are an index into Δ with i referring to the first segment and j to the last segment.

$$\mu_{i,j} = \frac{\sum_{k=i}^{j} \theta_k \times t_k}{\sum_{k=i}^{j} t_k} \tag{1}$$

Based on Equation 1 we define the quality switching variance σ as a modification of the variance. Therefore, we define Equation 2 which determines whether a segment should be considered for calculating the quality switching variance by returning 1 when bitrates of successive segments are different (i.e. $\theta_k \neq \theta_{k-1}$) which indicates a quality switching event or when there is only one segment retrieved (i.e. |Δ|=1).

$$\Gamma_k = \begin{cases} 1 & \text{if } |\Delta| = 1 \\ 1 & \text{if } |\Delta| > 1, \theta_k \neq \theta_{k-1} \\ 0 & \text{otherwise} \end{cases} \tag{2}$$

Equation 3 defines the quality switching variance σ over a given time window starting from segment i to segment j taking only quality switching events into account thanks to Γ from Equation 2. Please note that only switching events will influence the quality switching variance.

$$\sigma_{i,j}^2 = \frac{\sum_{k=i}^{j} \Gamma_k \times (\theta_k \times t_k - \mu_{i,j} \times t_k)^2}{\sum_{k=i}^{j} t_k} \tag{3}$$

In order to consider the switching direction, i.e. up to a higher or down to lower quality level, we define φ in Equation 4 which returns 1 for up switches, -1 for down switches, and 0 in case no switch occurs.

$$\phi_k = \begin{cases} 1 & \text{if } \theta_k > \theta_{k-1} \\ -1 & \text{if } \theta_k < \theta_{k-1} \\ 0 & \text{otherwise} \end{cases} \tag{4}$$

The oscillation variance ω in Equation 5 is similar to the quality switching variance and takes the direction of the quality switches into account. This metric converges to zero when an oscillation occurs and, thus, it shall be used in conjunction with the quality switching variance as shown below.

$$\omega_{i,j}^2 = \frac{\sum_{k=i+1}^{j} \phi_k \times (\theta_k \times t_k - \mu_{i,j} \times t_k)^2}{\sum_{k=i}^{j} t_k} \tag{5}$$

B. Throughput Specific

The throughput measurements are based on individual measurement points denoted as $\eta_k$ and lying at time instant $T_k$ and shown in Equation 6, again with variable length which may be independent of the segment length.

$$\eta_k = \frac{\Pi_{\tau_i}^{\tau_j}}{\tau_j - \tau_i}, i < j \tag{6}$$

$\Pi_{\tau_i}^{\tau_j}$ represents the bytes received between the instant of time $\tau_i$ and $\tau_j$ with $\tau_i < \tau_j$.

This enables the usage of measurement windows of arbitrary length for the calculation of the mean, standard deviation, and minimum/maximum over the throughput measurements points $\eta_k$.

C. Caching Specific

The reason of the problem leading to caching specific oscillations on the client is twofold, namely the false interpretation of the throughput measurement and, consequently, the switch to a quality level that is located on a source which cannot serve the selected quality smoothly to the client. Several tools are available to measure the effective available throughput for a segment which will be described in the following:
- The server may provide a non-cacheable object through the HTTP response header fields Pragma and Cache-Control both set to no-cache. Please note that the former is required for backwards-compatibility with HTTP/1.0. Using a non-cacheable object, the client is able to measure the effective available bandwidth to the server without taking caches into account. However, feasibility of this approach may be limited if caches do not comply with this parameter.
- Similar to the HTTP response header, the client may request a segment with the HTTP request header fields Pragma and Cache-Control both set to no-cache with the same effects as described above.
- The cache may actively modify the MPD and remove the quality levels that cannot be served towards the client, e.g, due to bandwidth limitations.
- The cache may provide an explicit service towards clients, the service providing information about the effective available bandwidth.

D. Buffer Specific

In [14] we show that an adaptation algorithm based on a mathematical buffer model improves the efficiency of earlier adaptation algorithms [15] that were mainly based on throughput measurements and basic buffer metrics. The buffer model is based on a mathematical function that restricts the available quality levels based on the buffer fill status, which can be fitted to the available quality levels and the network conditions.

This section shows examples for such models that calculate the quality level restriction for a segment i based on the buffer fill status $\delta$. Therefore, various functions may be used, e.g., linear, exponential, logarithmic, etc. and parameterized with the variables as shown in Equation 7a, 7b and 7c, respectively. The parameters can be used to increase or decrease the aggressiveness of the buffer model and as consequence also of the adaptation process. In our current adaptation logic we adopt the logarithmic function.

$$\xi(s_i) = a + \delta_i \times b \quad (7a)$$

$$\xi(s_i) = a \times e^{\delta_i \times b} \quad (7b)$$

$$\xi(s_i) = a \times \log_b(\delta_i \times c) \quad (7c)$$

where $i \in [1, N]$ represents the segment index, $\delta_i$ the buffer fill status at decoding of segment i, and a, b, c are constant parameters to fine-tune the model.

Please note that the parameters a, b and c in the above equations 7a, 7b and 7c are to be seen as individual parameters. Either one of equation 7a, 7b and 7c is used and accordingly, parameter b in equation 7a is to be set differently than compared to the case of using any of the other equations 7b and 7c.

Naturally, other functions to map the buffer fill status to bitrate may be used as well.

Finally, Equation 8 calculates the worst case buffer $\delta_{wcb}$ ($\theta_k$) based on the bitrate of the segment $\theta_k$ and the segment length $t_k$ as well as the minimum measured throughput of the current session $\min_i^j$.

$$\delta_{wcb}(\theta_k)_{i,j} = \frac{\theta_k \times t_i}{\min_{i,j}} \quad (8)$$

The output is the minimum buffer fill status in seconds that shall be available prior to the download of segment $s_k$ which shall guarantee no stalls at the client while downloading this segment.

Instead of the measured minimum throughput, other values for the minimum throughput may be used as well, such as the minimum available bitrate such as for example the minimum available bitrate as indicated in the MPD.

Figure 2:
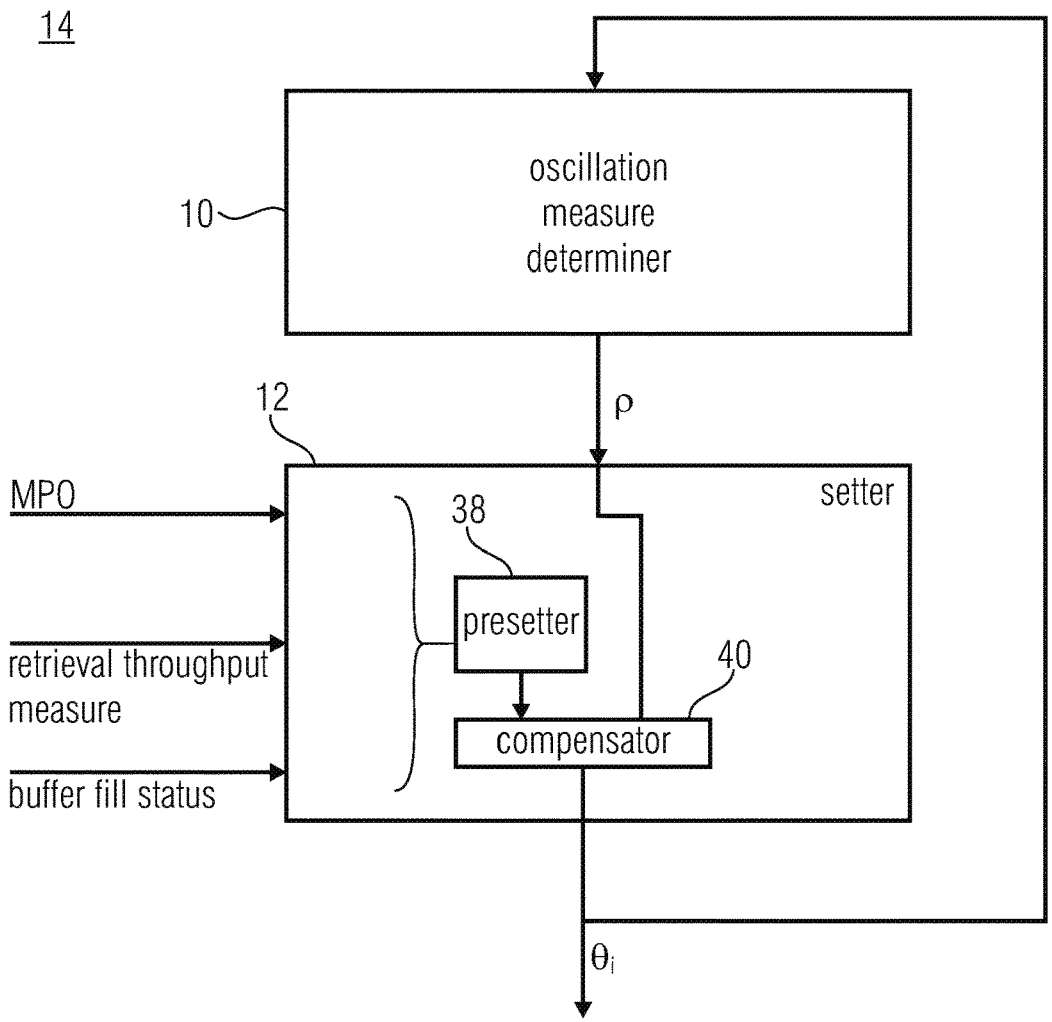
FIG. 2 shows a block diagram of an adaptation logic in accordance with an embodiment.

In other words, the presetter of FIG. 2 could be configured to compute the quality level restriction $\xi$ for the current segment based on the current buffer fill status $\delta_i$ measuring the buffer fill status in terms of presentation time duration currently contained within the buffer, for example. In preliminarily setting the bitrate at which the current segment is to be retrieved, the presetter then restricts a set $\Lambda$ of available bitrates $\theta_n'$ with n=1 ... N and $\theta_{n-1}' < \theta_n'$ to ones out of this set, being lower than $\xi$, thereby yielding a subset of $\theta_n'$ all elements $\theta_n'$ of which are smaller than $\xi$. Further, the presetter may be configured to compute a worst case buffer value $\delta_{wcb}$ indicating a minimum buffer fill status which shall be available prior to a reception of the current segment i based on $$\delta_{wcb} = \frac{\theta_i \times t_i}{\min}$$

where min a value representing a minimum throughput, $t_i$ is the time duration of the current segment and $\theta$ is an available bitrate $\theta_n'$ for the current segment. In particular, in preliminarily setting the bitrate at which the current segment is to be retrieved, the presetter restrict the set of available bitrates $\theta_n'$ to ones out of this set, for which $\delta_{wcb}$ is below the buffer fill state $\delta_i$. In which order presetter applies quality level restriction and worst case buffer value in order to restrict the set $\Lambda$ of available bitrates of the content to be retrieved, as presented for example in the MPD, may be varied. In any case, the presetter may, for example, be configured to select the highest bitrate among the "twice" restricted set $\{\theta_n' \in \Lambda | \theta_n' < \xi \wedge \delta_{wcb}(\theta_n') < \delta_i\}$ of available bitrates for the current segment, i.e. to be max $\{\theta_n' \in \Lambda | \theta_n' < \xi \wedge \delta_{wcb}(\theta_n') < \delta_i\}$.

The metrics introduced above may be used to detect oscillations and to improve the adaptation logic compared to, for example, [14]. In particular, the methods [13] and [14] may, for example, be combined. Additionally, a dynamic buffer model may be applied at runtime based on our metrics and tools. The improvements address the oscillation issues as described above, i.e. buffer overrun, competing bandwidth, and caching, for example.

A. Oscillation Detection

For the oscillation detection an oscillation factor $\rho$ may be defined as in Equation 9 which depends on the quality switching variance $\sigma$ and the oscillation variance $\omega$.

$$\rho_{i,j} = \begin{cases} 1 - \frac{\omega_{i,j}}{\sigma_{i,j}} & \text{if } \sigma_{i,j} > 0 \\ 0 & \text{otherwise} \end{cases} \quad (9)$$

FIG. 1 illustrates the oscillation detection based on a predefined adaptation behavior. The upper part of the figure shows a predefined adaptation behavior, which is used to demonstrate our metrics for a windows size of 20 seconds. The quality switching and oscillation variance (i.e. σ and ω) are shown in the middle part of the figure and the lower part depicts the oscillation factor (i.e. ρ).

At the beginning the client starts with the lowest available quality level and continuously switches up to the highest quality level. During that period the quality switching and oscillation variance are equal, which results in a oscillation factor of zero. This behavior confirms our previous statement that the oscillation variance alone cannot be used to distinguish between plain quality switching and real oscillations. As soon as the quality switching and oscillation variance start to become different, the oscillation factor increases which, in fact, indicates an oscillation as shown in FIG. 1 around second 25.

After having described possible metrics suitable for measuring the bitrate oscillation, embodiments are described which take advantage of such oscillation measures so as to form an adaptation logic for appropriately setting the bitrate so as to avoid or suppress or reduce upcoming bitrate oscillations.

FIG. 2 shows a possible adaptation logic for varying a bitrate at which segments of a sequence of segments of a media content are to be retrieved. That adaptation logic comprises, as shown in FIG. 2, an oscillation measure determiner 10 and a setter 12. The details of the functionality of these elements will be described herein below. The adaptation logic is generically indicated using reference sign 14.

Figure 3:
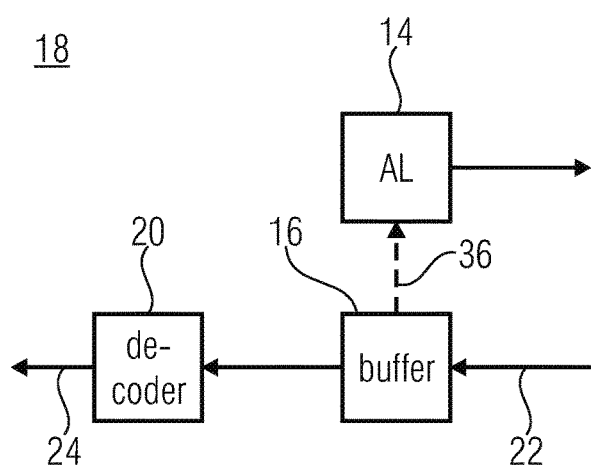
FIG. 3 shows a block diagram of a client device in accordance with an embodiment, the client device comprising the adaptation logic of FIG. 2.

As illustrated in FIG. 3, the adaptation logic 14 is responsible for controlling a bitrate at which a media content is retrieved from a server so as to be buffered in a buffer 16 of a client 18 so as to be reproduced via a client's decoder 20. To be more precise, the client 18 may comprise the buffer 16 and decoder 20 connected in series between an input 22, at which the received media data stream representing the media content is received, and an output 24, at which decoder 20 outputs the reconstructed version of the media content, wherein the client 18 also comprises the adaptation logic 14 which controls the bitrate at which the segments of a sequence of segments, into which the media content is subdivided, are retrieved from the server which is, however, not shown in FIG. 3.

Figure 4:
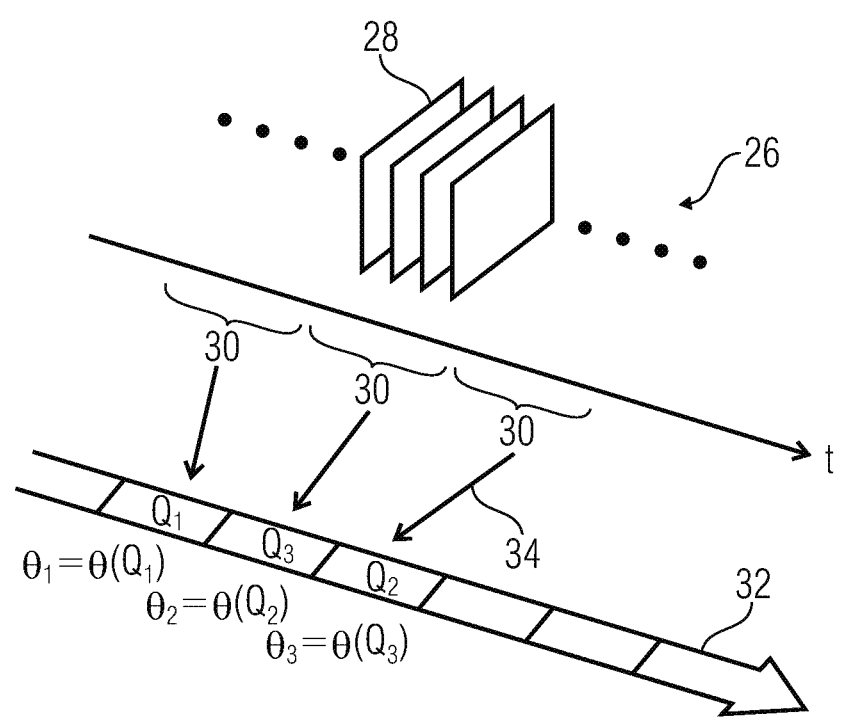
FIG. 4 shows a schematic illustrating an inbound information content with varying bitrate, resulting, for example, by adapting/controlling the bitrate by adaptation logic of FIG. 2.

FIG. 4 illustrates the inbound media content arriving at the input of buffer 16 as a video 26 composed of a sequence of frames or pictures 28 although, however, it is noted that the media content may alternatively be of any other type such as an audio content, a time-varying 3D mesh of an object or some other media data describing a time-varying media information content. The media content 26 is subdivided into a sequence of segments. In particular, each segment 30 is shown to cover a respective time-interval out of a presentation time axis t of the media content 26. The media contents 30 gaplessly, and without overlap, cover the overall reproduction time of the media content.

The media content 26 arrives at input 22 at a varying bitrate. To this end, FIG. 4 also illustrates the data stream which describes the media content 26, or has encoded thereinto the media content 26, and arrives at input 22. This data stream 32 has each sequence 30 encoded thereinto as indicated by arrows 34. Each segment 30 is coded into the data stream 32 using an amount of data which is not only dependent on the size, i.e. time duration, of the respective segment 30, but also on some coding parameter which controls the ratio between quality on the one hand and compression rate on the other hand. FIG. 4 exemplarily indicates this coding parameter with $Q_i$ with the index i denoting the quality to bitrate ratio level. Thus, the inbound data stream 32 represents each segment 30 of the media content at a certain bitrate which depends on the ratio between the data amount spent for the respective segment and the time-duration of the respective segment, i.e. the segment's portion out of the media content. This relationship is illustrated in FIG. 4 by writing $\theta_i$'s beside the data stream 32 beside each portion of data stream 32 corresponding to the i-th segment 30, wherein the bitrate scales with the coding parameter $Q_j$ as illustrated in FIG. 4 by stating that $\theta_i$ is $\theta(Q_{j(i)})$ with j(i) being the quality level of segment i.

Turning back to the adaptation logic 14, same is responsible for setting the coding parameters $Q_{j(i)}$ for the segments j, thereby also controlling, as just outlined, the bitrate $\theta_j$ of these segments. There is a tendency that the buffer 16 empties if the bitrate set for the segments exceeds the available transmission bandwidth between server and client 18, and that the buffer 16 gets full whenever the bitrate set for the segments 30 is lower than the available bandwidth, as the media content, namely the video 26, is reproduced, and accordingly read-out from the buffer 16, at the constant reproduction rate. In order to control the bitrate, the adaptation logic 14 requests the download of a current segment from the server with the appropriate bitrate.

In order to determine the bitrate for a current segment, the adaptation logic may be informed of the available bitrate levels or quantization levels $Q_i$ at which the segments of the media content are available. As described above, the media presentation description MPD is an example of such an information source. The MPD is, for example, sent from the server to client 18. Further, the adaptation logic 14 may estimate the available bandwidth based on bitrates of previously retrieved segments. Even further, the adaptation logic 14 may, as illustrated by the dotted error 36 in FIG. 3, survey the buffer fill status of buffer 16 so as to appropriately control the bitrate at which a current segment is requested to be retrieved/downloaded from the server, namely so as to avoid buffer 16 getting empty or avoid buffer 16 getting full.

However, in order to avoid the previously described bitrate oscillations, the adaptation logic 14 is configured as shown in FIG. 2 and described hereinafter. In particular, bitrate oscillations occur whenever the bitrate of consecutive segments 30 alternately decreases and increases, thereby causing, as described above, subjective quality degradations of the reproduction of the media content since such quality switching events decrease the subjective quality of the reproduction result.

Turning back to FIG. 2 showing the adaptation logic 14 in accordance with an embodiment of the present application, the oscillation measure determiner 10 is configured to determine an oscillation measure ρ measuring a balance of bitrate increase and bitrate decrease of the varied bitrate at which recently retrieved segments of the sequence of segments have been retrieved such as, for example, relating to some window extending from the current segment i+1, exclusively, to some previously retrieved segment j together forming, for example, a window of certain length measured, for example, in a number segments or, for example, in seconds or the like. The setter 12 is configured to set the bitrate $\theta_i$ at which a current segment i of the sequence of segments 30 is to be retrieved depending on the oscillation measure ρ.

The above described parameter ρ in equation 9 forms one example for the oscillation measure ρ which may be used.

It measures, as outlined above, a balance of a bitrate increase and bitrate decrease of the varied bitrate $\theta_i$ at which recently retrieved segments of the sequence of segments 30 have been retrieved in that ω weighs between bit rate increases, for which $\Phi_k$ is positive, and bitrate decreases for which $\Phi_k$ is negative. However, the specific example outlined above may be modified as is briefly discussed herein below before discussing possible implementation details concerning setter 12 further.

In particular, in accordance with an intermediate generalization embodiment, the oscillation measure determiner 10 could be configured to determine the oscillation measure ρ by computing a measure for a deviation between a weighted sum of a measure of a bitrate change strength at bitrate change events of the varied bitrate at which the recently retrieved segments of the sequence of segments have been retrieved, at immediately following segments of the sequence of segments, without taking the bitrate change direction into account, and the weighted sum of the measure of the bitrate change strength at the bitrate change events of the varied bitrate at the immediately following segments of the sequence of segments, taking the bitrate change direction into account, i.e. by determining the deviation of the same weighted sum, once determined with all addend being positive, and once determined with addends being positive or negative depending on the bitrate change direction, each addend measuring the respective bitrate change strength. As outlined above, the oscillation measure determiner 10 could be configured to compute, as the measure for the deviation, a ratio between the weighted sums. Alternatively, a difference may be used. In particular, in the example of equations 1 to 6 and 9, the weighted sums meant here are the ones from equations 3 and 5, which merely differ in factors $\Gamma_k$ as used in equation 3, being replaced by $\Phi_k$ used in equation 5. The oscillation measure determiner may be configured to use, as the measure of the bitrate change strength, a power of two of a difference between the bitrate of the most recently retrieved segment among the immediately following segments of the sequence of segments, and a running mean bitrate at which the recently retrieved segments of the sequence of segments have been retrieved, i.e. $|\theta_k-\mu_{i,j}|^2$, with k denoting the most recently received segment among immediately following segments k and k−1 at which the bitrate changes from $\theta_{k-1}$ to $\theta_k$. However, instead of using the power of order 2 of the difference, the power of a different order α may be used instead. Moreover, in accordance with an alternative embodiment, the bitrate change strength between segments k and k−1 could, alternatively, be measured by using a power of any order of an absolute difference or a magnitude of the difference $\theta_k - \theta_{k-1}$.

Expressing the just outlined generalizations mathematically, the oscillation measure determiner 10 could be configured to compute, as the oscillation measure, $\rho_{i,j}$, $$A = \sum_{k=i}^{j} \Gamma_k \times t_k^\beta \times |\theta_k - \mu_{i,j}|^\alpha / \sum_{K=i}^{j} t_k$$

$$B = \sum_{k=i}^{j} \Phi_k \times t_k^\beta \times |\theta_k - \mu_{i,j}|^\alpha / \sum_{K=i}^{j} t_k$$

$$\rho_{i,j} = \begin{cases} 1 - B/A & \text{if } A > 0 \\ 0 & \text{otherwise} \end{cases}$$

$$\phi_k = \begin{cases} 1 & \text{if } \theta_k > \theta_{k-1} \\ -1 & \text{if } \theta_k < \theta_{k-1} \\ 0 & \text{otherwise} \end{cases}$$

-continued $$\Gamma_k = \begin{cases} 1 & \text{if } |\Delta| = 1 \\ 1 & \text{if } |\Delta| > 1, \theta_k \neq \theta_{k-1} \\ 0 & \text{otherwise} \end{cases}$$

$$\Delta = \{(\theta_i, t_i), (\theta_{i+1}, t_{i+1}), \ldots, (\theta_{j-1}, t_{j-1}), (\theta_j, t_j)\}$$

with $i, j \in N$ wherein indices i,j,k denote the i-th, j-th and k-th segments of the sequence of segments, lying within a predetermined sliding time window preceding the current segment, each segment i having length $t_1$ and being retrieved at bitrate $\theta_k$, and with $\mu_{i,j}$ being a measure for a central tendency of the bitrate at which the k-th segments between the i-th and j-th segments, both inclusively, have been retrieved.

Although not described above, it could be that the oscillation measure determiner 10 varies the window within which the bitrate change events are evaluated for determining the oscillation measure, i.e. the instance where $\Phi_k$ is unequal to zero, so as to be especially sensitive to oscillations of different kinds, or to be more precise, to oscillations of different sources. Alternatively, the oscillation measure determiner 10 could concurrently continuously determine different oscillation measures merely deviating from each other in that same are determined over windows covering different numbers of recently retrieved segments.

As described in more detail herein below and illustrated in FIG. 2, in accordance with a possible implementation of setter 12, same may comprise a presetter 38 configured to preliminarily set the bitrate $\theta_i$ at which the current segment i is to be retrieved using a first manner which depends on a buffer fill status of a buffer buffering the sequence of segments and/or a measure measuring a retrieval throughput at which the sequence of segments are retrieved, as well as a compensator 40 responsible for taking the oscillation measure ρ provided by oscillation measure determiner 10 into account so as to correctly set the finally set bitrate $\theta_i$ based on the preliminarily set one provided by presetter 38.

That is, the presetter 38 may use information such as the MPD, retrieval throughput measure(s), examples of which have been outlined above, and/or the buffer fill status concerning buffer 16 so as to preliminarily set $\theta_i$ or alternatively speaking, find a preliminary value for $\theta_i$ while compensator 40 is responsible for avoiding that the presetter's 38 mode of operation leads to a bitrate oscillation as already depicted in FIG. 1, for example.

Possible measures which the presetter 38 may use in order to preliminarily set the bitrate at which a current segment is to be retrieved, have been discussed above, such as for example $\mu_{i,j}$, the throughput measurement $\eta_k$ of equation 6, a caching specific value as described above in section C obtained, optionally, using measures circumventing corruptions of the bandwidth measurements by intermediate caching entities. In relation to the use of a buffer fill status for preliminarily setting the bitrate of a currently to be retrieved segment, presetter 38 may use any of the buffer specific functions of any of equations 7a to 7c, for example.

The compensator 40, in turn is configured to operate in a normal mode and an oscillating mode. In the normal mode, the compensator 40 surveys the oscillation measure ρ and, depending on the surveillance of the oscillation measure ρ, leaves the preliminary set bitrate as obtained from presetter 38, unamended so as to become the bitrate finally set by setter 12, as long as the oscillation measure ρ keeps below a predetermined oscillation threshold. In the pseudocode discussed hereinafter, this threshold is denoted "threshold". As soon as the oscillation measure exceeds the predetermined oscillation threshold, however, the compensator 40 switches from the normal mode to the deoscillating mode. Then, in the deoscillating mode, the compensator 40 temporarily sets the bitrate $\theta_i$ at which the current segment as well as the bitrate $\theta_{i+n}$ at which N subsequent segments of the sequence of segments with n=1 . . . N are to be retrieved, using a second manner leading to less variations of the bitrate than compared to the first manner used by presetter 38, and then re-entering the normal mode. In the pleudocode discussed hereinafter, N is represented by variable "backoff" and the second manner which leads to less bitrate variation, i.e. leads to variations of the bitrate lower in frequency and lower in amplitude, is realized by the second and third general if clauses extending from lines 8 to 24 of the pleudocode.

In particular, imagine for example, the adaptation logic of FIG. 2 is implemented using a logarithmic behavior as defined in equation 7c, for example, while setting parameters a, b and c as follows: a=2000000, b=2, and c=5. For the log of zero, the function will return zero when the buffer fill status is zero. Following this base model allows for smooth adaptation as it is indirectly coupled with the throughput and not based on throughput measurements, which turns out to be a major benefit as shown in our experiments, specifically when clients compete for bandwidth and even more when caches are involved.

In order to reduce the oscillation, any oscillation detection as described so far may be used, i.e. any of the above oscillation measures. The compensator's 40 mode of operation may follow the Compensation Algorithm (CA) defined in Algorithm 3. In case an oscillation is detected, the CA aims to smooth it as exemplified in FIG. 5. The CA will be activated when the oscillation factor exceeds a predefined threshold (cf. lines 1-7) and has two phases: a low quality phase referred to as low compensation (cf. lines 8-24) and a high quality phase referred to high compensation (cf. lines 17-24). In the low compensation, the adaptation logic or the compensator 40 thereof maintains the low quality level of the detected oscillation phase until a backoff timer expires or when the buffer fill status falls below $\delta_{wcb}$ of the corresponding quality level. In the high compensation, it remains on the high quality level of the detected oscillation until the buffer fill status falls below the level as it was when the CA was activated. Additionally, the algorithm exits the high compensation when the buffer increases during that phase which indicates a bandwidth increase. This mechanism intends to smooth the oscillation utilizing the buffer.

| Algorithm 1: Compensation Algorithm (CA). |
| --- |
| 1   if $\rho_i^j$ > threshold and compensation == false then |
| 2     \|   saved_$\delta_i = \delta_i$; low_quality = min$_i^j$; |
| 3     \|   high_quality = max$_i^j$; compensation = true; |
| 4     \|   compensationLowQuality = true; |
| 5     \|   compensationHighQuality = false; |
| 6     \|   backoff = increase_backoff( ); |
| 7   end |
| 8   if compensationLowQuality == true then |
| 9     \|   decrease_backoff( ); |
| 10    \|   if backoff > 0 and $\delta_i < \delta_{web}$(low_quality) then |
| 11    \|     \|   quality_level_next_segment = low_quality; |
| 12    \|   else |
| 13    \|     \|   compensationLowQuality = false; |
| 14    \|     \|   compensationHighQuality = true; |
| 15    \|   end |
| 16  end |
| 17  if compensationHighQuality == true then |
| 18    \|   if $\delta_i$ > safed_$\delta_i$ and $\delta_i$ decreasing then |
| 19    \|     \|   quality_level_next_segment = high_quality; |
| 20    \|   else |
| 21    \|     \|   compensationHighQuality = false; |
| 22    \|     \|   compensation = false; |
| 23    \|   end |
| 24  end |

Accordingly, the compensator 40 may be configured, in the deoscillating mode, to sequentially run through a low bitrate mode having been called low quality phase in the above description, and then a high bitrate mode having been called high quality phase in the above description. The compensator 40 freezes the bitrate to a first bitrate in the low bitrate mode and freezes the bitrate to a second bitrate higher than the first bitrate, in the high bitrate mode. The compensator 40 then switches from the low bitrate mode to the high bitrate mode at an earlier buffer fill status exceeding a first predetermined fill level and a time duration of the compensator being in the low bitrate mode exceeding a predetermined time threshold. In the pleudocode discussed above, the first predetermined fill level was represented by $\delta_{web}$ (low_quality), whereas the predetermined time threshold was defined by the function increase_backoff ( ). A compensator 40 leaves the high bitrate mode if the buffer fill status falls below a second predetermined fill level represented by saved_$\delta_i$, which is the buffer fill status at the time of entering the deoscillating mode.

Needless to say that variations of the exact implementation of the compensator 40 are feasible.

Figure 5:
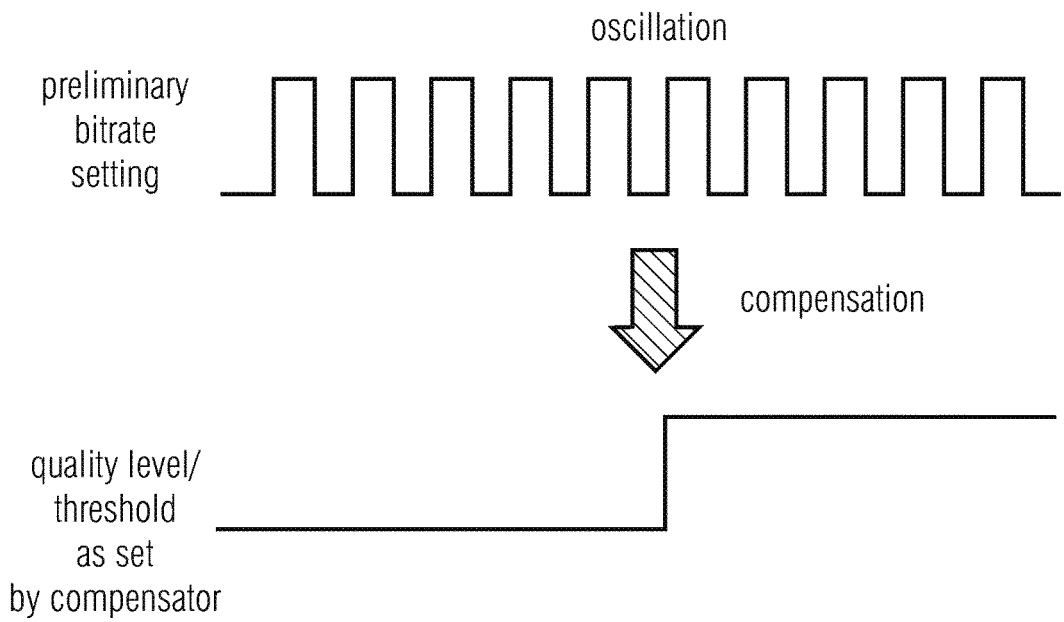
FIG. 5 schematically illustrates an oscillation compensation in accordance with an embodiment.
Figure 6:
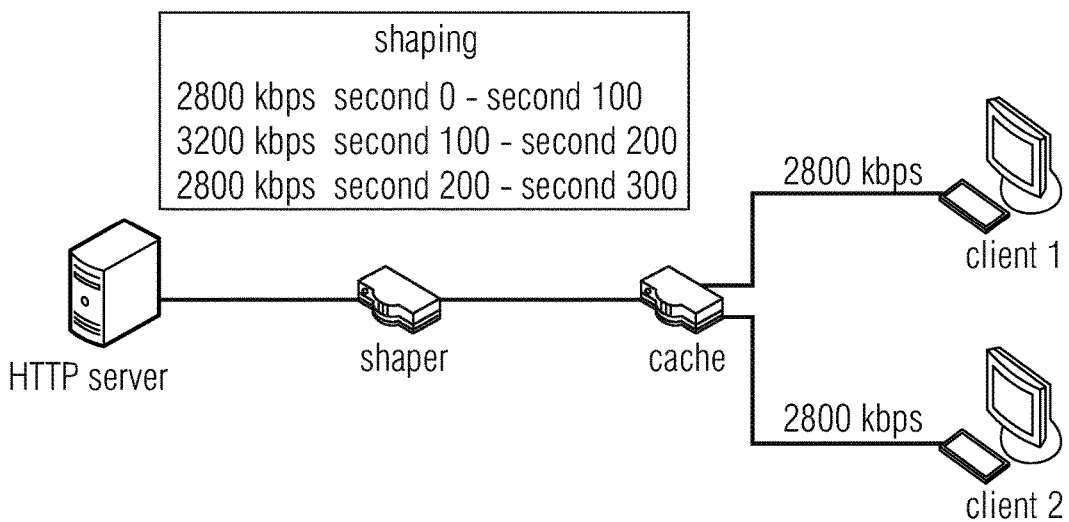
FIG. 6 schematically illustrates an experimental setup having been used for experimentally proving the advantages gained by use of the oscillation detection and compensation of FIG. 5.

FIG. 5 schematically illustrates an oscillation compensation in accordance with an embodiment. FIG. 6 schematically illustrates an experimental setup having been used for experimentally proving the advantages gained by use of the oscillation detection and compensation of FIG. 5.

In the following, we describe our experimental results. We compare the above improved adaptation logic embodiment comprising the buffer model of equation 7c and the oscillation detection and compensation algorithm CA against a simply throughput-based adaptation logic. The latter takes the throughput measurements as a basis for the quality switching. Our experimental setup consists of a content server that provides an excerpt of 300 s from the Big Buck Bunny sequence in six different media bitrates with constant bitrate (350, 700, 1300, 1900, 2500, and 3400 kbps) and a segment length of 2 seconds. Two clients are connected to the content server through a cache and a bottleneck that simulates a predefined but varying available bandwidth (2800-3200 kbps) as shown in FIG. 6.

Figure 7A:
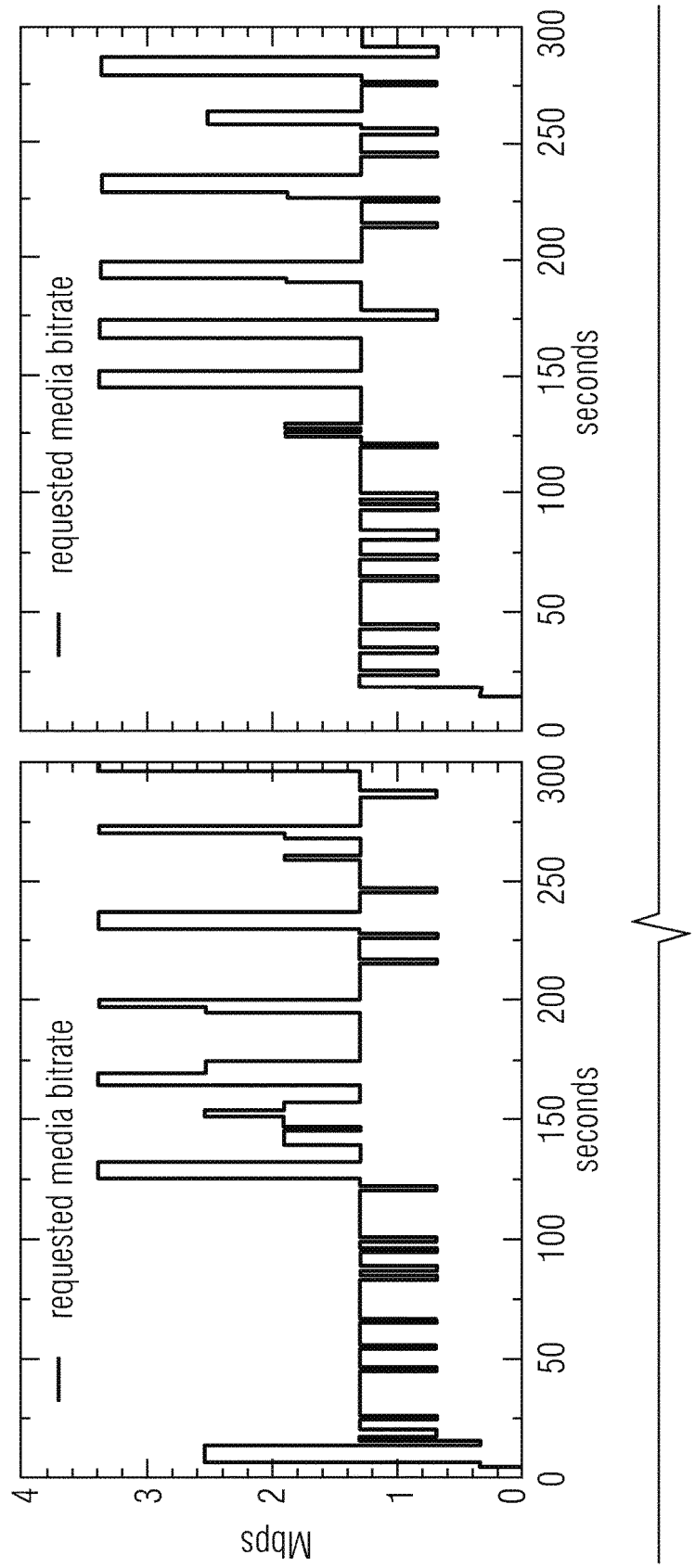
FIGS. 7a-7b show graphs describing the requested bitrate and buffer state in connection with a throughput-based adaptation without cache influences.
Figure 7B:
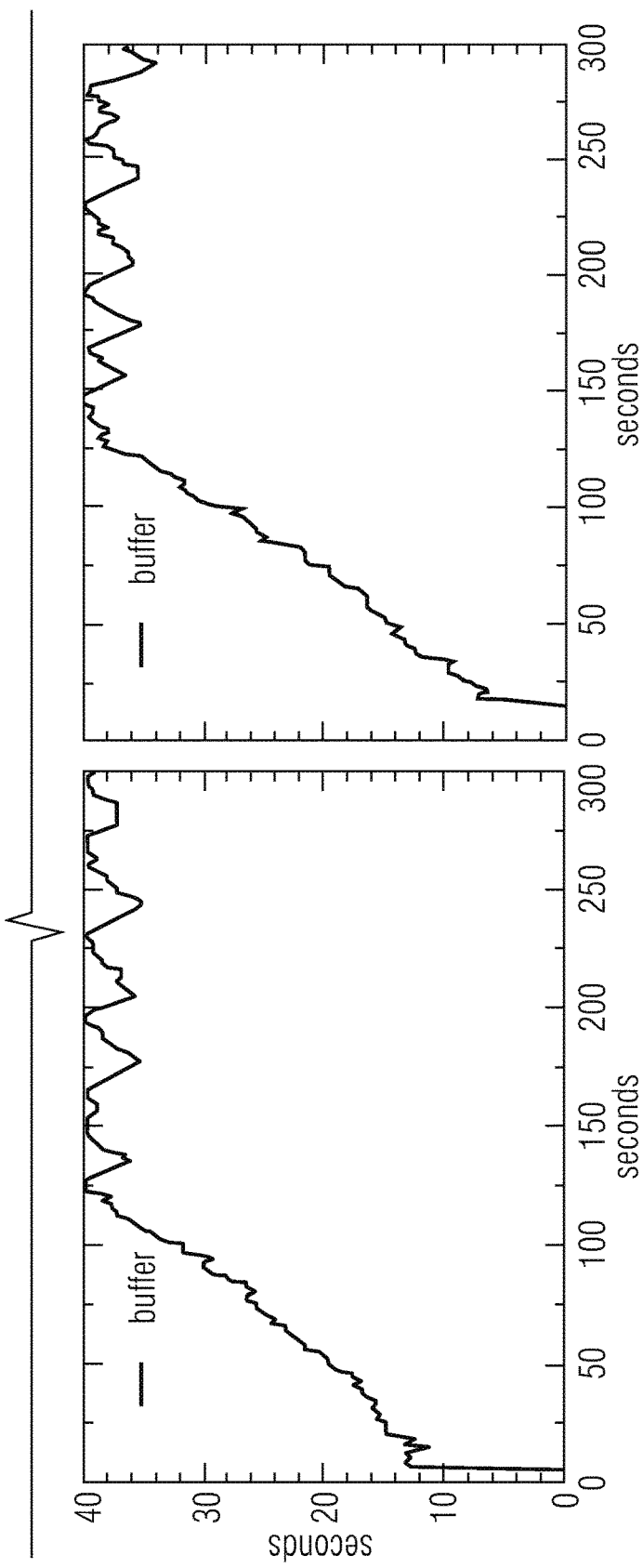

First, we present the results of the throughput-based adaptation algorithm with and without cache followed by the results of the improved adaptation logic. FIGS. 7a-7b show the results for Client 1 (in red on the left) and Client 2 (in blue on the right) without a cache. The upper part shows the requested media bitrate and the lower part depicts the buffer fill status, both over the 300 s. Client 1 starts 10 seconds before Client 2 and, thus, is able to fully utilize the bottleneck in the beginning, i.e. it selects the quality level with 2500 kbps. After Client 2 starts its session, both clients have to share the bottleneck and, if done in a fair manner, each client will get a share of about 1400 kbps of the available bandwidth. The representation with 1300 kbps comes very close but throughput measurements are sometimes above and sometimes below this bitrate due the behavior of the underlying TCP implementation. Thus, the throughput measurements in both clients leads to an oscillation between the 700 and 1300 kbps respectively. This oscillation decreases between second 100 and 200 after increasing the bottleneck to 3200 kbps.

In this scenario, no quality level is available that fits exactly the available bandwidth. Therefore, both clients select a lower quality level which fills up their buffers until they are full which results in the ON/OFF behavior mentioned above. Once the buffer is full, the throughput measurements return a wrong value as the client implementation (on the application layer) cannot continuously read data from the transport layer while TCP keeps receiving data that will be buffered within the kernel. Additionally, with this behavior both clients influence each other in a negative way. For example, in second 125 client 1 stops the download process (as the buffer is full) which leads to an oscillation on client 2. After client 1 continuous with the download, client 2 has to switch to a lower quality level. The same behavior occurs in second 160 but here client 2 stops its download process and client 1 starts to oscillate.

Figure 8A:
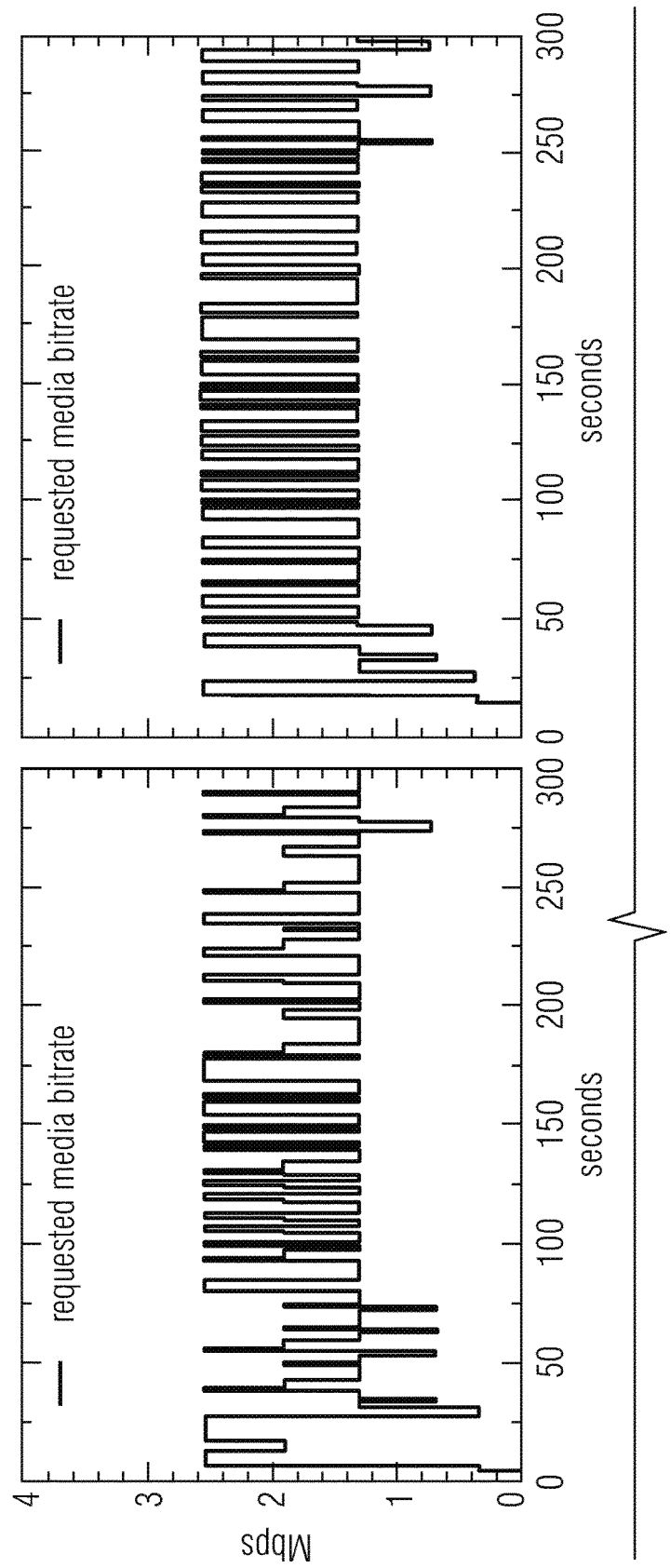
FIGS. 8a-8b show graphs illustrating the requested bitrate and buffer state resulting from a throughput-based adaptation with cache influences.
Figure 8B:
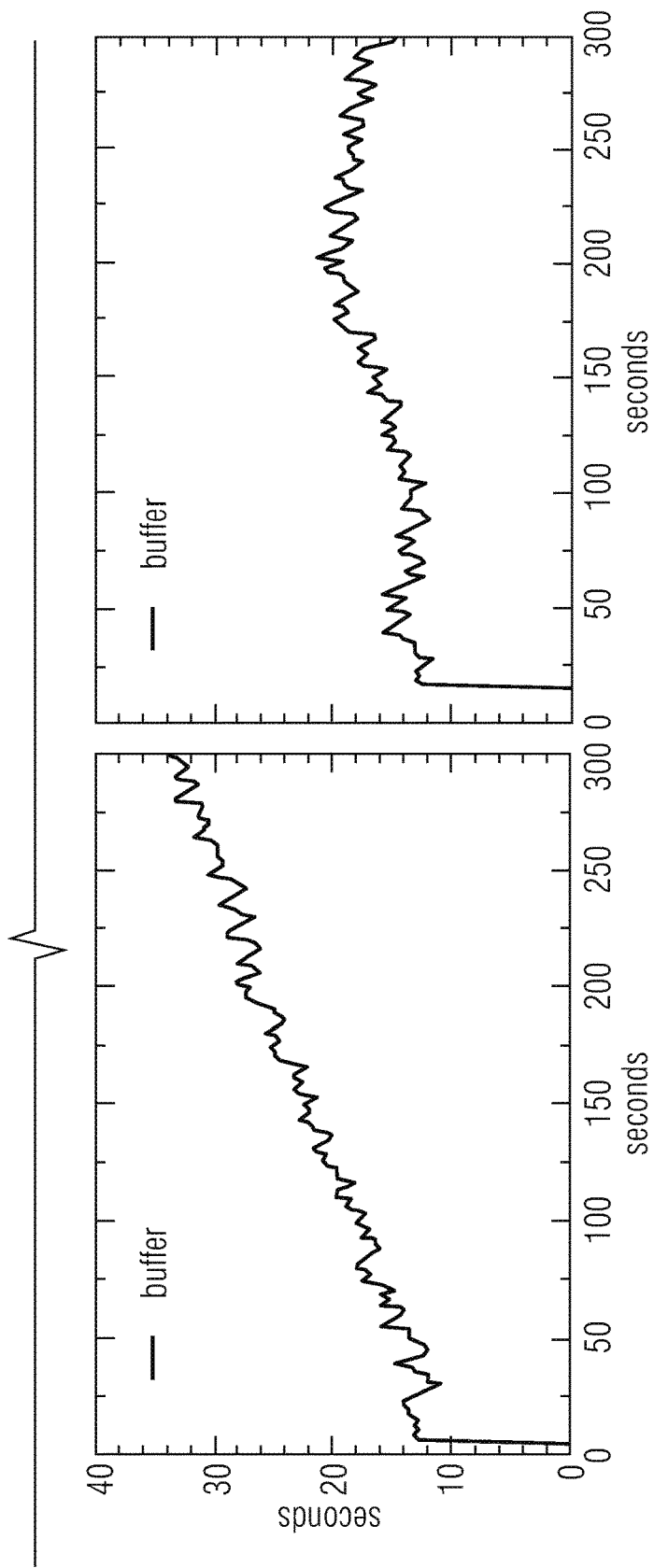
Figure 9A:
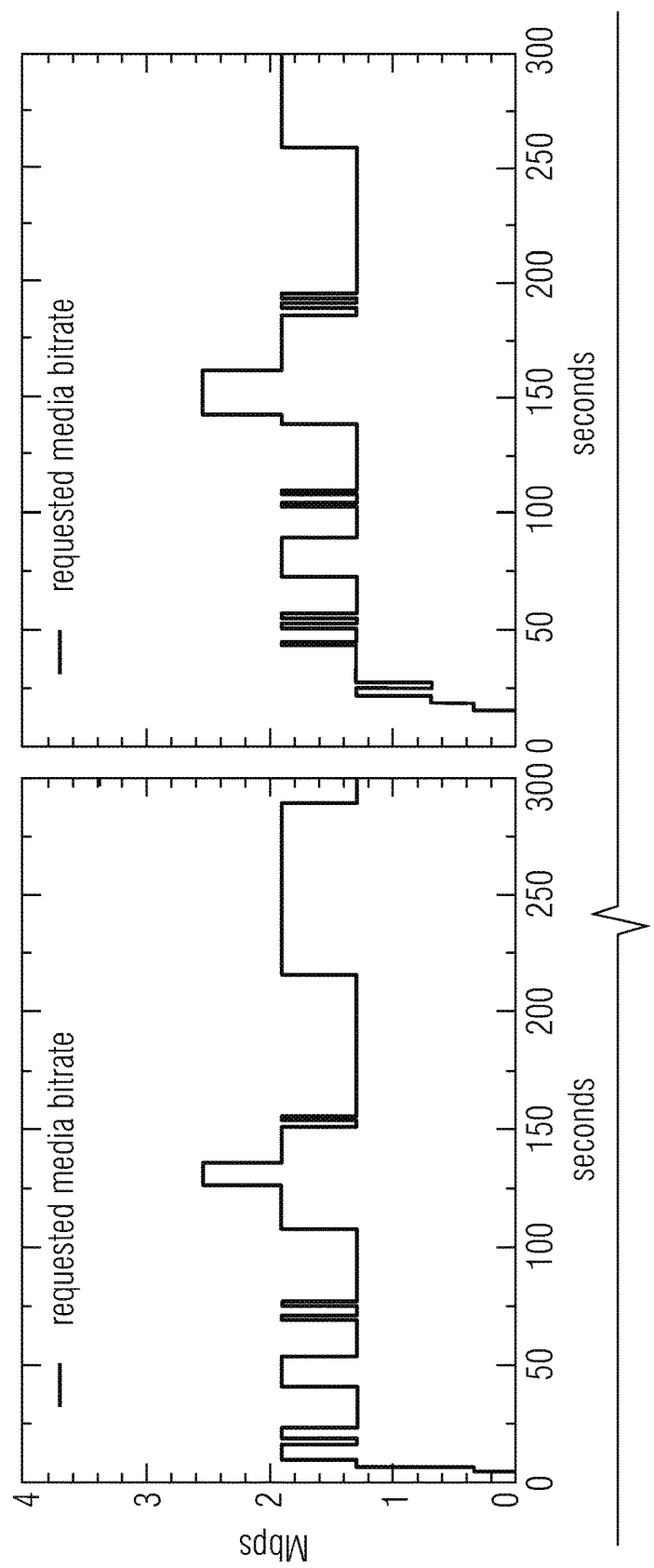
FIGS. 9a-9c show graphs of a requested bitrate, buffer state and an oscillation factor used as an oscillation measure as obtained by using a buffer model based adaptation including a compensation algorithm in accordance with an embodiment of the present application without cache influences.
Figure 9B:
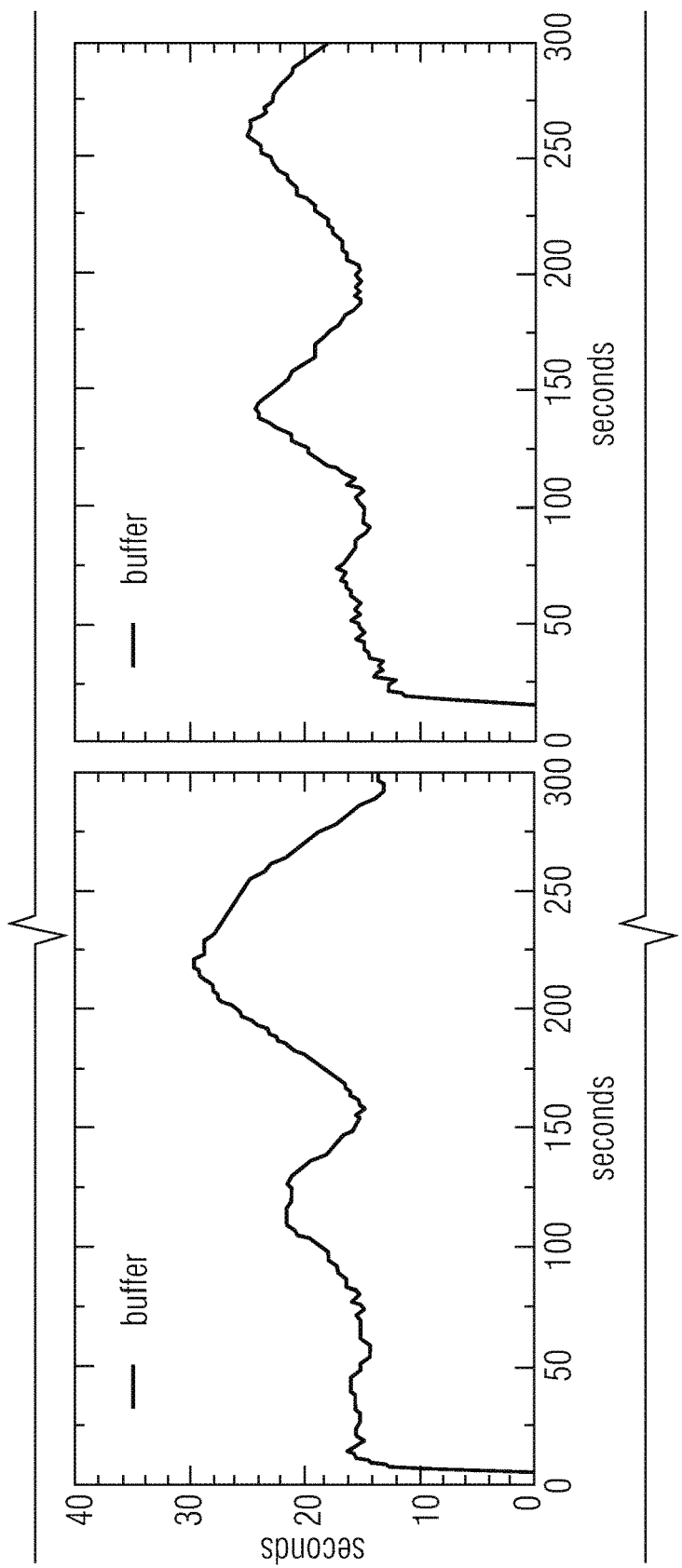
Figure 9C:
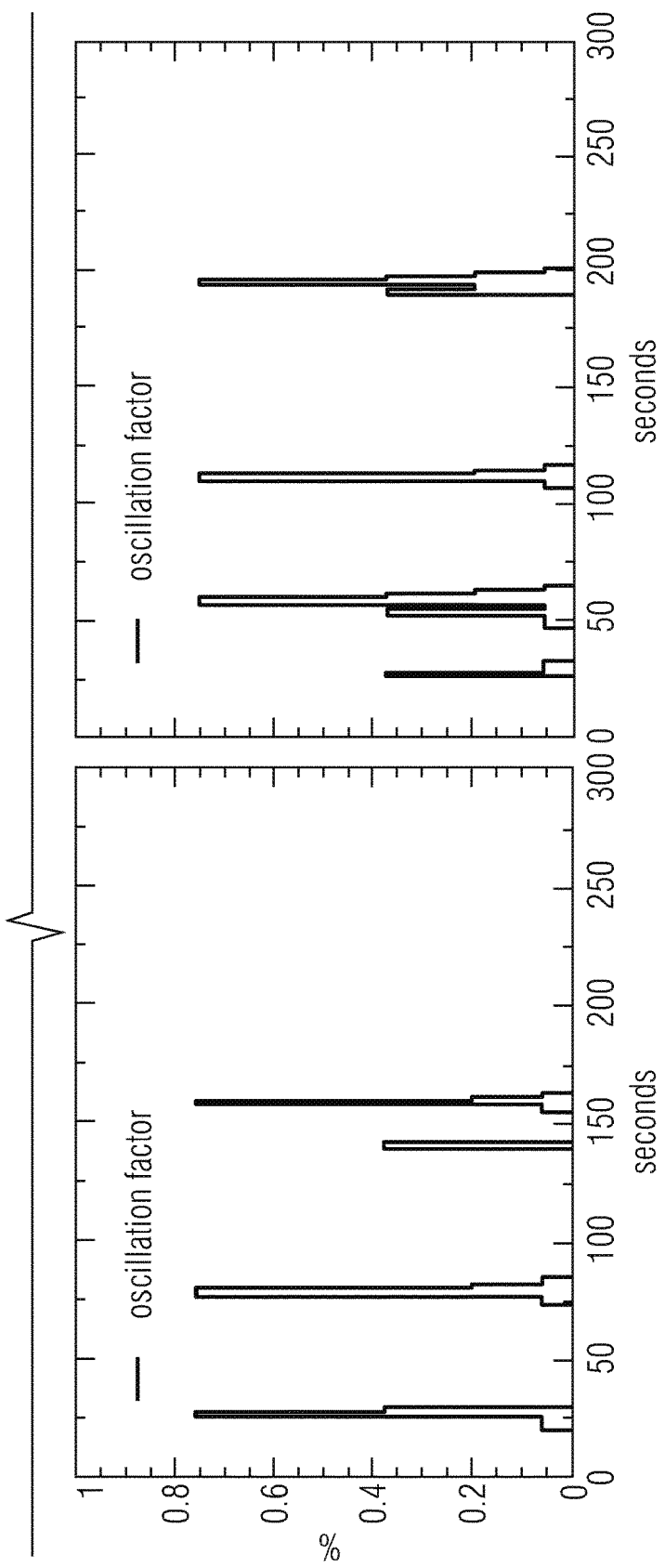
Figure 10A:
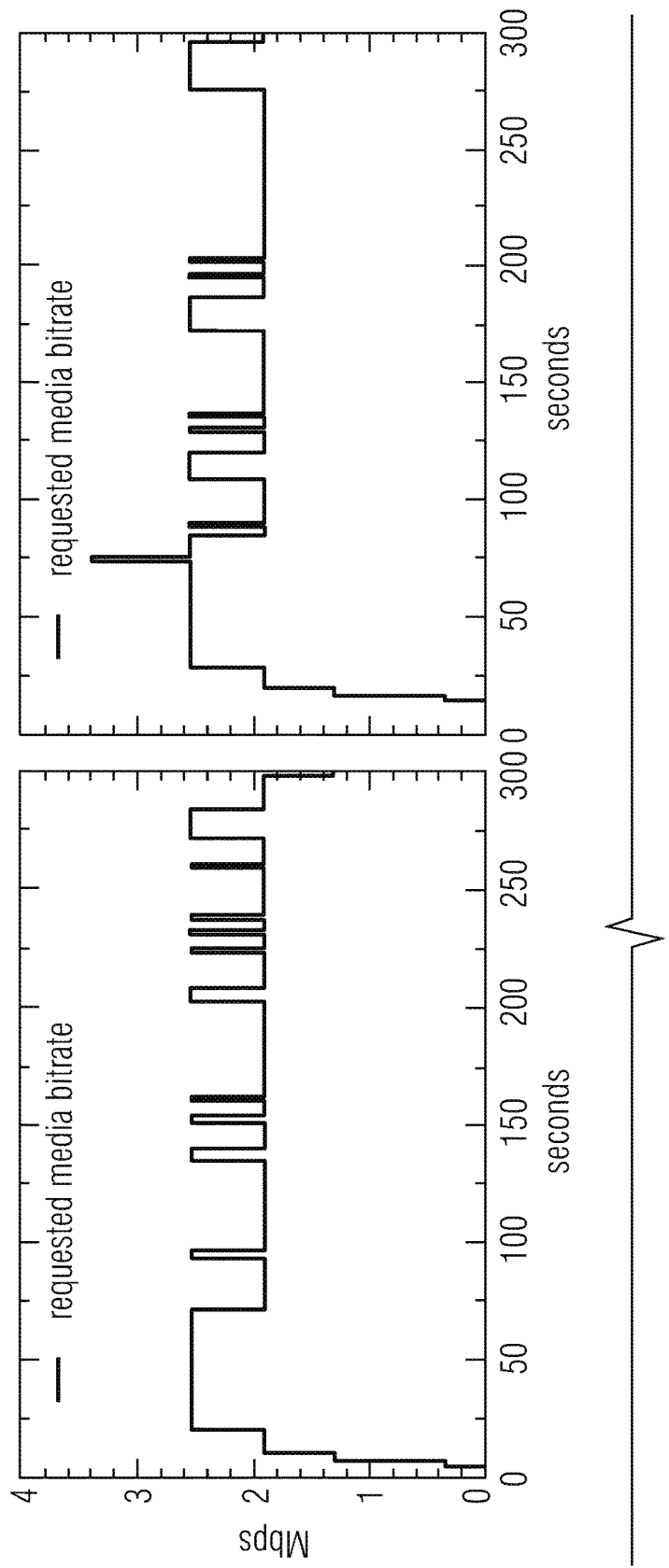
FIGS. 10a-10c show graphs of a requested bitrate, buffer state and an oscillation factor used as an oscillation measure as obtained by using a buffer model based adaptation including a compensation algorithm in accordance with an embodiment of the present application with cache influences.
Figure 10B:
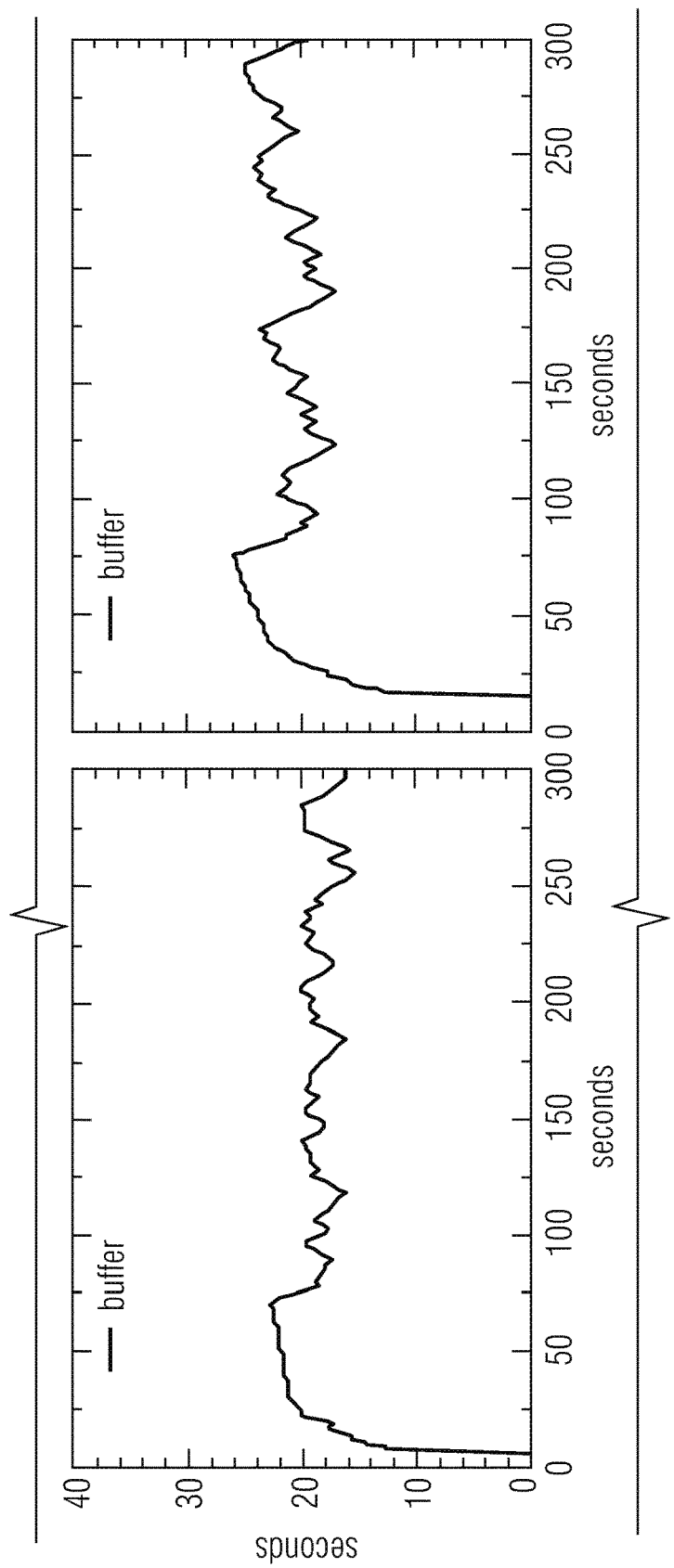
Figure 10C:
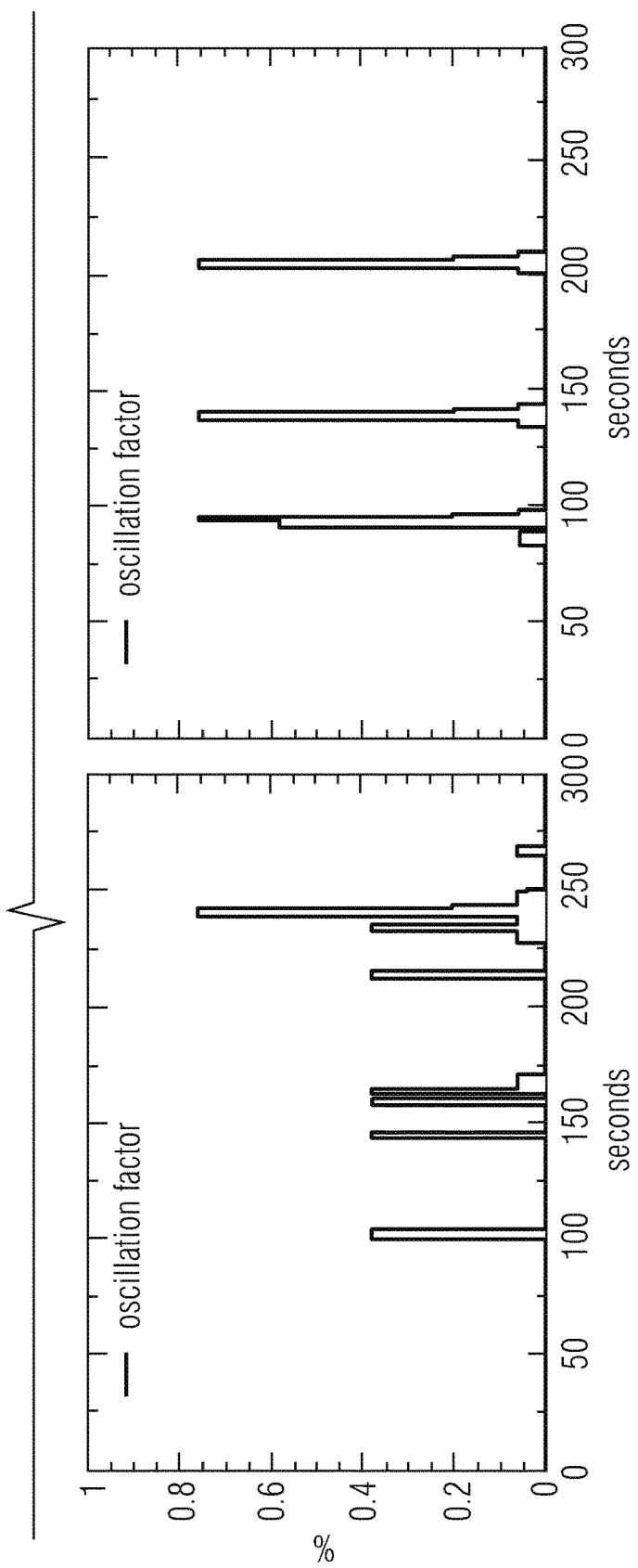

FIG. 5 schematically illustrates an oscillation compensation in accordance with an embodiment. FIG. 6 schematically illustrates an experimental setup having been used for experimentally proving the advantages gained by use of the oscillation detection and compensation of FIG. 5. FIG. 7*a* and FIG. 7*b* show graphs describing the requested bitrate and buffer state in connection with a throughput-based adaptation without cache influences. FIG. 8*a* and FIG. 8*b* show graphs illustrating the requested bitrate and buffer state resulting from a throughput-based adaptation with cache influences. FIG. 9*a*, FIG. 9*b* and FIG. 9*c* show graphs of a requested bitrate, buffer state and an oscillation factor used as an oscillation measure as obtained by using a buffer model based adaptation including a compensation algorithm in accordance with an embodiment of the present application without cache influences. FIG. 10*a*, FIG. 10*b* and FIG. 10*c* show graphs of a requested bitrate, buffer state and an oscillation factor used as an oscillation measure as obtained by using a buffer model based adaptation including a compensation algorithm in accordance with an embodiment of the present application with cache influences.

FIGS. 8*a*-8*b* show the behavior of the throughput-based adaptation logic with a cache which should enable a more efficient usage of the bottleneck. However, when comparing the results with the experiment without a cache, the adaptation behavior on both clients gets worse and both clients frequently oscillate between 1300 and 2500 kbps. This problem is also shown in [13] with different throughput-based adaptation logics (i.e. Microsoft Smooth Streaming and the DASH VLC plugin).

The results of the improved adaptation logic are shown in FIGS. 9*a*-9*c* and FIGS. 10*a*-10*c*. Compared to the previous figures, they also include the oscillation factor and the threshold is set to 0.7. Hence, each time the oscillation factor passes this threshold, the compensation algorithm CA is activated. FIGS. 9*a*-9*c* show the behavior of our buffer model based adaptation algorithm without a cache. The adaptation is much smoother compared to the throughput-based adaptation and after a stabilization phase at the beginning it never falls below the quality level with 1300 kbps. Furthermore, the adaptation logic adequately detects oscillations and compensates those with the compensation algorithm. In particular, in second 25 the adaptation logics detects the oscillations and compensates it with the low quality level which lasts until approximately second 40 followed by the high compensation until the buffer reaches the previous state at around second 50. Another compensation phase starts at second 75 and the high compensation starts approximately at second 100, the point in time when the bottleneck increases to 3200 kbps. The increased bandwidth is recognized during the high compensation (second 125) which the adaptation logic preempts and switches to a higher quality level. The adaptation logic detects another oscillation at second 150 which leads to another compensation phase that lasts almost until the end of the experiment.

We also evaluate the improved adaptation logic with a cache enabled and its results are shown in FIGS. 10*a*-10*c*. In comparison to the throughput-based adaptation it is able to utilize the cache in way that it can maintain a higher base quality (i.e. 1900 kbps) excluding the startup stabilization phase of both clients. Moreover, oscillations are detected, compensated, and the buffer fill status remains stable at an acceptable level.

Figure 11:
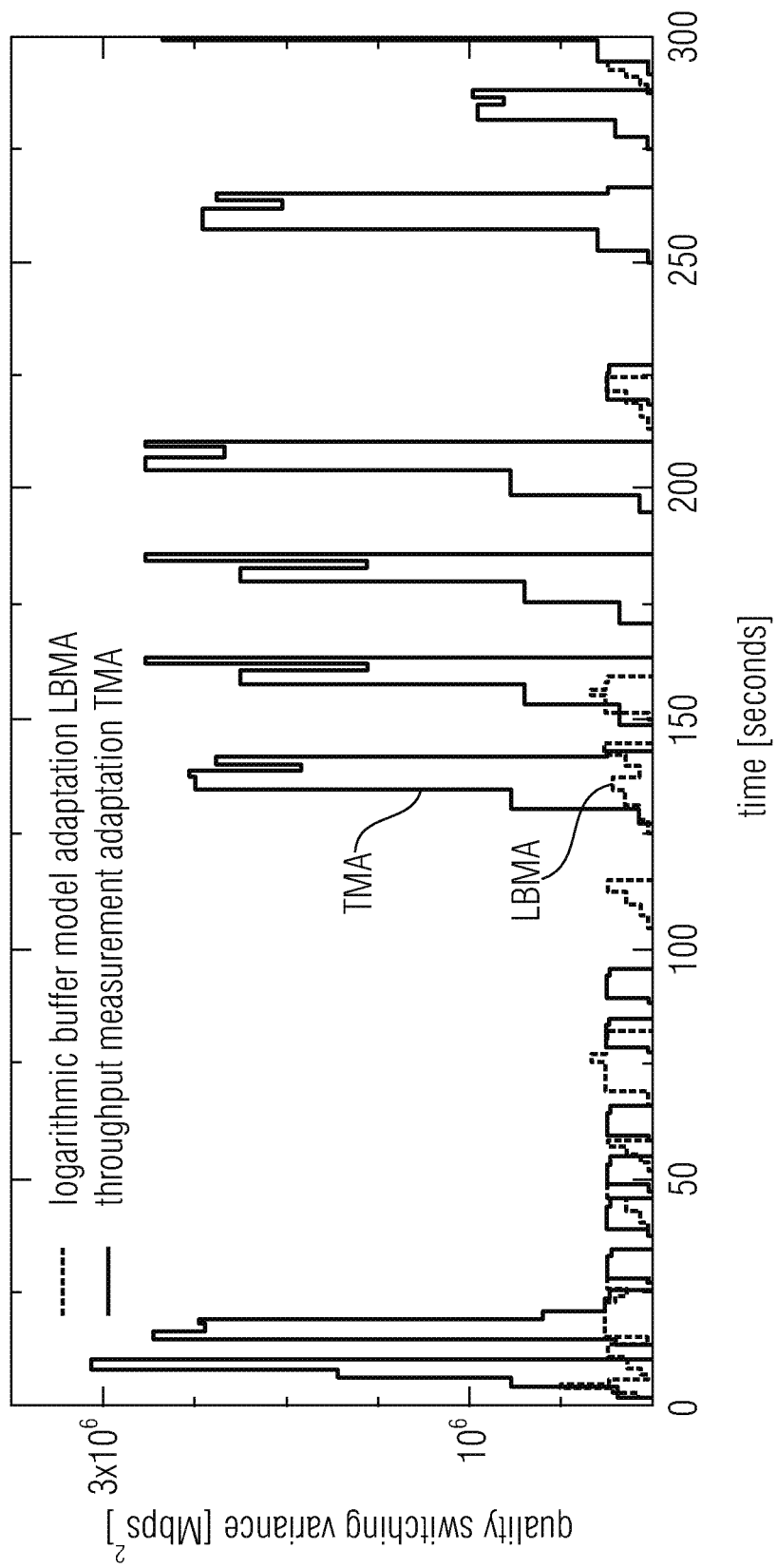
FIG. 11 shows a graph comparing a quality switching variant for client 1 of FIG. 6 without cache influences.
Figure 12:
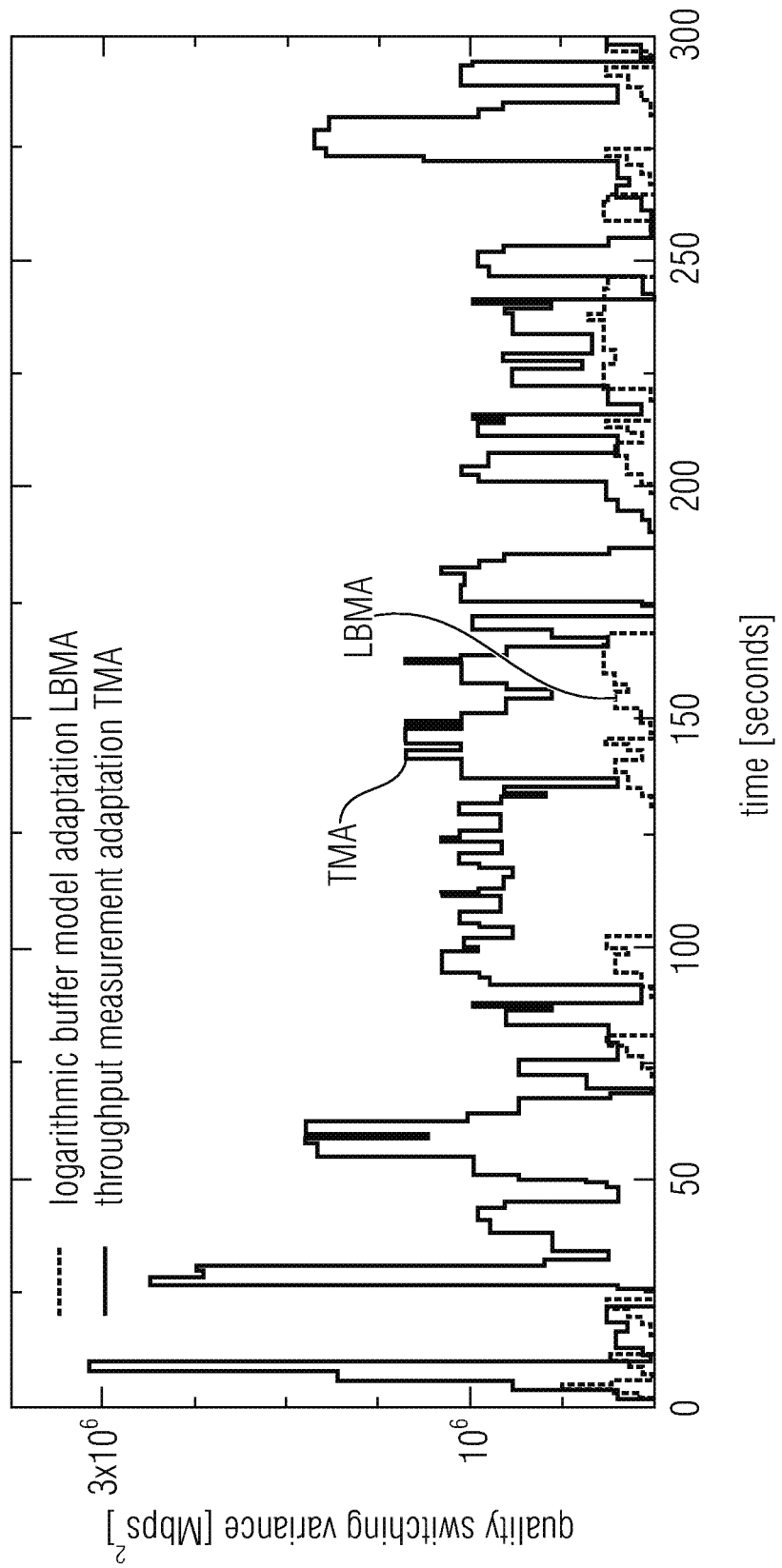
FIG. 12 shows a comparison of the quality switching variant for client 1 with cache influences.

Finally, we compare the average media bitrate and quality switching variance of the improved adaptation logic versus the simple throughput-based adaptation logic. The results reveal that the improved adaptation logic achieves on average a higher media bitrate of 11.63% if no caches are involved and 19.75% for the scenario with caches enabled. Additionally, the improved adaptation logic achieves a higher hit rate for the cache of 17.42% compared to the throughput-based adaptation logic. Concerning the quality switching variance, FIG. 11 and FIG. 12 show that the improved adaptation logic has 86.95% less quality switching variance for the scenario without cache and 90.75% less quality switching variance if the cache is enabled.

Thus, in the above, problems in todays' adaptive streaming systems caused by throughput-based adaptation mechanisms and their influence when clients compete for bandwidth, specifically in the presence of caches, have been discussed. Using the oscillation-measure-aware adaptation, a comprehensive toolset to compensate for undesirable client behavior caused by incomplete network information is provided, and based thereon, the DASH streaming performance may be optimized at the same time. The experimental results validate these findings, i.e. oscillation detection and compensation (with and without caches enabled) while increasing the media throughput at the client (+11.63% without cache, +19.75% with cache) and increasing the hit rate at the cache (+17.42%) while maintaining a stable buffer fill status. Finally, the oscillation detection and compensation algorithm is a client-centric approach which enables scalability and keeps maintaining the advantages of DASH. In other words, above embodiments address the problem that streaming multimedia over the Internet is omnipresent but still in its infancy, specifically when it comes to the adaptation based on bandwidth measurements, clients competing for limited bandwidth, and the presence of a caching infrastructure. When combining buffer-based adaptation logic with a toolset of client metrics as described above falsified adaptation decisions caused by incomplete network information available at the client and issues introduced when multiple clients compete for bandwidth or when caches are deployed may be compensated for. The metrics enable the detection of oscillations on the client and provide an effective compensation mechanism. The result is a fair share and oscillation compensating dynamic adaptive streaming over HTTP.

With regard to FIG. 2, it should be emphasized that the implementation details described or shown therein with regard to, for example, setter 12, are merely to be understood as an example and may be modified in order to arrive at alternative embodiments. The compensation using the oscillation measure may be implemented differently. Instead of using a behavior according to which a deoscillating mode is abruptly entered whenever the oscillation measure exceeds some threshold, may be modified so as to gradually increase an oscillation countermeasure.

As to implementation details, it should be noted that the adaptation logic shown in FIG. 2 may be implemented in software, programmable hardware or hardware. The client device shown in FIG. 3 may likewise be implemented in software, programmable hardware or hardware itself. In particular, the client may be an application running, for example, on a mobile device such as a mobile communication device having for example an LTE interface.

With respect to the above embodiments, it is further noted that all of the metrics and embodiments for avoiding/compensating oscillations are also applicable in other network architectures. This is, for example, true of information-centric networks (ICN) and content-centric networks (CCN) where caching of media contents plays a central role and there is no point to point connection as is the case in nowadays IP based networks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] Adobe HTTP Dynamic Streaming. Technical report, Adobe Systems Inc., 2013.
[2] Akhshabi, Saamer and Anantakrishnan, Lakshmi and Dovrolis, Constantine and Begen, Ali C. Server-based Traffic Shaping for Stabilizing Oscillating Adaptive Streaming Players.:19-24, 2013.
[3] Saamer Akhshabi and Sethumadhavan Narayanaswamy and Ali C. Begen and Constantine Dovrolis. An Experimental Evaluation of Rate-Adaptive Video Players over HTTP. *Signal Processing: Image Communication,* 27(4): 271-287, 2012.
[4] CISCO. Cisco Visual Networking Index: Global Mobile Data Traffic Forecast Update, 2012â€ "2017. Technical report, CISCO, 2013.
[5] De Cicco, Luca and Mascolo, Saverio. An Experimental Investigation of the Akamai Adaptive Video Streaming. *Proceedings of the 6th international conference on HCI in work and learning, life and leisure: workgroup human-computer interaction and usability engineering* in USAB'10, pages 447-464, Berlin, Heidelberg, 2010. Springer-Verlag.
[6] Ali El Essaili AND Damien Schroeder AND Dirk Staehle AND Mohammed Shehada AND Wolfgang Kellerer AND Eckehard Steinbach. Quality-of-Experience driven Adaptive HTTP Media Delivery. *IEEE International Conference on Communications (ICC* 2013), Budapest, Hungary, 2013.

[7] Tobias Hoßfeld and Sebastian Egger and Raimund Schatz and Markus Fiedler and Kathrin Masuch and Charlott Lorentzen. Initial Delay vs. Interruptions: Between the Devil and the Deep Blue Sea. *QoMEX* 2012, Yarra Valley, Australia, 2012.

[8] Houdaille, Rémi and Gouache, Stéphane. Shaping HTTP Adaptive Streams for a Better User Experience. *Proceedings of the 3rd Multimedia Systems Conference* in MMSys '12, pages 1-9, New York, N.Y., USA, 2012. ACM.

[9] Kuschnig, Robert and Kofler, Ingo and Hellwagner, Hermann. Evaluation of HTTP-based Request-Response Streams for Internet Video Streaming. *Proceedings of the second annual ACM conference on Multimedia systems* in MMSys '11, pages 245-256, New York, N.Y., USA, 2011. ACM.

[10] Le Callet, Patrick and Möller, Sebastian and Perkis, Andrew. Qualinet White Paper on Definitions of Quality of Experience (2012). Technical report, European Network on Quality of Experience in Multimedia Systems and Services (COST Action IC 1003), 2012.

[11] Liu, Chenghao and Bouazizi, Imed and Gabbouj, Moncef. Rate Adaptation for Adaptive HTTP Streaming. *Proceedings of the second annual ACM conference on Multimedia systems* in MMSys '11, pages 169-174, New York, N.Y., USA, 2011. ACM.

[12] Mok, Ricky K. P. and Luo, Xiapu and Chan, Edmond W. W. and Chang, Rocky K. C. QDASH: a QoE-aware DASH System. *Proceedings of the 3rd Multimedia Systems Conference* in MMSys '12, pages 11-22, New York, N.Y., USA, 2012. ACM.

[13] Mueller, C. and Lederer, S. and Timmerer, C. A Proxy Effect Analysis and Fair Adaptation Algorithm for Multiple Competing Dynamic Adaptive Streaming over HTTP Clients. *Visual Communications and Image Processing (VCIP)*, 2012 *IEEE*, pages 1-6, 2012.

[14] Muller, C. and Renzi, D. and Lederer, S. and Battista, S. and Timmerer, C. Using Scalable Video Coding for Dynamic Adaptive Streaming over HTTP in Mobile Environments. *Signal Processing Conference (EUSIPCO)*, 2012 *Proceedings of the 20th European*, pages 2208-2212, 2012.

[15] Müller, Christopher and Lederer, Stefan and Timmerer, Christian. An Evaluation of Dynamic Adaptive Streaming over HTTP in Vehicular Environments. *Proceedings of the 4th Workshop on Mobile Video* in MoVid '12, pages 37-42, New York, N.Y., USA, 2012. ACM.

[16] Ni, Pengpeng and Eg, Ragnhild and Eichhorn, Alexander and Griwodz, Carsten and Halvorsen, Påål. Flicker Effects in Adaptive Video Streaming to Handheld Devices. *Proceedings of the 19th ACM international conference on Multimedia* in MM '11, pages 463-472, New York, N.Y., USA, 2011. ACM.

[17] Oyman, O. and Singh, S. Quality of Experience for HTTP Adaptive Streaming Services. *Communications Magazine, IEEE*, 50(4):20-27, 2012.

[18] Pantos, R. AND May, W. HTTP Live Streaming. Technical report, Apple Inc., 2011.

[19] Podlipnig, Stefan and Böszörmenyi, Laszlo. A Survey of Web Cache Replacement Strategies. *ACM Comput. Surv.*, 35(4):374-398, 2003.

[20] Popa, Lucian and Ghodsi, Ali and Stoica, Ion. HTTP as the Narrow Waist of the Future Internet. *Proceedings of the 9th ACM SIGCOMM Workshop on Hot Topics in Networks* in Hotnets-IX, pages 6:1-6:6, New York, N.Y., USA, 2010. ACM.

[21] Wei Pu and Zixuan Zou and Chang Wen Chen. Video Adaptation Proxy for Wireless Dynamic Adaptive Streaming over HTTP. *Packet Video Workshop (PV)*, 2012 *19th International*, pages 65-70, 2012.

[22] Riiser, Haakon and Bergsaker, Hakon S. and Vigmostad, Paul and Halvorsen, Pal and Griwodz, Carsten. A Comparison of Quality Scheduling in Commercial Adaptive HTTP Streaming Solutions on a 3G Network. *Proceedings of the 4th Workshop on Mobile Video* in MoVid '12, pages 25-30, New York, N.Y., USA, 2012. ACM.

[23] Riiser, Haakon and Endestad, Tore and Vigmostad, Paul and Griwodz, Carsten and Halvorsen, Pål. Video Streaming Using a Location-based Bandwidth-Lookup Service for Bitrate Planning. *ACM Trans. Multimedia Comput. Commun. Appl.*, 8(3):24:1-24:19, 2012.

[24] Sánchez de la Fuente, Yago and Schierl, Thomas and Hellge, Cornelius and Wiegand, Thomas and Hong, Dohy and De Vleeschauwer, Danny and Van Leekwijck, Werner and Le Louédec, Yannick. iDASH: Improved Dynamic Adaptive Streaming over HTTP using Scalable Video Coding. *Proceedings of the second annual ACM conference on Multimedia systems* in MMSys '11, pages 257-264, New York, N.Y., USA, 2011. ACM.

[25] Sandvine. Global Internet Phenomena Report: 2H 2012. Technical report, Sandvine, 2012.

[26] Christian Sieber and Tobias Hoßfeld and Thomas Zinner and Phuoc Tran-Gia and Christian Timmerer. Implementation and User-centric Comparison of a Novel Adaptation Logic for DASH with SVC. *IFIP/IEEE International Workshop on Quality of Experience Centric Management (QCMan)*, Ghent, Belgium, 2013.

[27] Iraj Sodagar. The MPEG-DASH Standard for Multimedia Streaming Over the Internet. *IEEE MultiMedia*, 18(4):62-67, 2011.

[28] Stockhammer, Thomas. Dynamic Adaptive Streaming over HTTP: Standards and Design Principles. *Proceedings of the second annual ACM conference on Multimedia systems* in MMSys '11, pages 133-144, New York, N.Y., USA, 2011. ACM.

[29] Stockhammer, Thomas. TS 26.247 Transparent End-to-End Packet-Switched Streaming Service (PSS); Progressive Download and Dynamic Adaptive Streaming over HTTP. Technical report, 3GPP, 2011.

[30] Timmerer, Christian and Griwodz, Carsten. Dynamic adaptive streaming over HTTP: from content creation to consumption. *Proceedings of the 20th ACM international conference on Multimedia* in MM '12, pages 1533-1534, New York, N.Y., USA, 2012. ACM.

[31] Wang, Bing and Kurose, Jim and Shenoy, Prashant and Towsley, Don. Multimedia Streaming via TCP: An Analytic Performance Study. *ACM Trans. Multimedia Comput. Commun. Appl.*, 4(2): 16:1-16:22, 2008.

[32] Zambelli, Alex. IIS Smooth Streaming Technical Overview. Technical report, Microsoft Corporation, 2009.

The invention claimed is:

1. Apparatus for retrieving segments of a sequence of segments of an information content from a server so as to be reproduced by a client with varying bitrate,
the apparatus comprising:
an oscillation value determiner configured to determine an oscillation value based on bitrate changes at which recently retrieved segments have been retrieved, and a setter configured to set a bitrate at which a current segment is to be retrieved depending on the oscillation value,
wherein the setter comprises a presetter and a compensator,
wherein the presetter preliminarily sets the bitrate at which the current segment is to be retrieved using a first manner depending on at least one of a buffer fill status of the buffer buffering the sequence of segments and a retrieval throughput at which the sequence of segments are retrieved from the server,
wherein if the oscillation value is below a predetermined oscillation threshold, the compensator leaves the preliminarily set bitrate unamended, so as to become the bitrate set by the setter, and
wherein if the oscillation value exceeds the oscillation threshold, the compensator sets the bitrate at which the current and the bitrate at which subsequent segments are to be retrieved using a second manner running sequentially through a low bitrate mode setting the bitrate to a first bitrate and a high bitrate mode setting the bitrate to a second bitrate being higher than the first bitrate,
wherein the oscillation value determiner is configured to determine the oscillation value depending on a bitrate change strength.

2. Apparatus according to claim 1, wherein the compensator after reducing the oscillation value leaves the preliminarily set bitrate unamended.

3. Apparatus according to claim 1, wherein the compensator is configured to switch from the low bitrate mode to the high bitrate mode at an earlier of
the buffer fill status exceeding a first predetermined fill level, and
a time duration of the compensator being in the low bitrate mode exceeding a predetermined time threshold, and
wherein the compensator is configured to switch from the high bitrate mode to the low bitrate mode if the buffer fill status falls below a second predetermined fill level.

4. Adaptation logic according to claim 1, wherein the oscillation value determiner is configured to determine the oscillation value by computing a value for a deviation between a weighted sum of a value of the bitrate change strength at bitrate change events of the varied bitrate at which the recently retrieved segments of the sequence of segments have been retrieved, at immediately following segments of the sequence of segments, without taking the bitrate change direction into account, and the weighted sum of the value of the bitrate change strength at the bitrate change events of the varied bit rate at the immediately following segments of the sequence of segments, with taking the bitrate change direction into account.

5. Adaptation logic according to claim 4, wherein the oscillation value determiner is configured to compute, as a value for the deviation, a ratio between the weighted sums.

6. Adaptation logic according to claim 4, wherein the oscillation value determiner is configured to use, as the value of the bit rate change strength, a power of order of an absolute difference between the bitrate of the most recently received segment among the immediately following segments of the sequence of segments, and a running mean bitrate at which the recently retrieved segments of the sequence of segments have been retrieved.

7. Adaptation logic according to claim 4, wherein the oscillation value determiner is configured to determine the oscillation value with respect to the bitrate change events within a window of a number of recently received segments varying in time, or with respect to windows of different numbers of recently received segments, so as to address different sources of bitrate oscillations.

8. Adaptation logic according to claim 4, wherein the oscillation value determiner is configured to compute, as the oscillation value, $\rho_{i,j}$ according to $$A = \sum_{k=i}^{j} \Gamma_k \times t_k^{\beta} \times |\theta_k - \mu_{i,j}|^{\alpha} \Big/ \sum_{K=i}^{j} t_k$$

$$B = \sum_{k=i}^{j} \Phi_k \times t_k^{\beta} \times |\theta_k - \mu_{i,j}|^{\alpha} \Big/ \sum_{K=i}^{j} t_k$$

$$\rho_{i,j} = \begin{cases} 1 - B/A & \text{if } A > 0 \\ 0 & \text{otherwise} \end{cases}$$

$$\phi_k = \begin{cases} 1 & \text{if } \theta_k > \theta_{k-1} \\ -1 & \text{if } \theta_k < \theta_{k-1} \\ 0 & \text{otherwise} \end{cases}$$

$$\Gamma_k = \begin{cases} 1 & \text{if } |\Delta| = 1 \\ 1 & \text{if } |\Delta| > 1, \theta_k \neq \theta_{k-1} \\ 0 & \text{otherwise} \end{cases}$$

$$\Delta = \{(\theta_i, t_i), (\theta_{i+1}, t_{i+1}), \ldots, (\theta_{j-1}, t_{j-1}), (\theta_j, t_j)\} \text{ with } i, j \in \mathbb{N}$$

wherein indices i,j,k denote the i-th, j-th and k-th segments of the sequence of segments, lying within a predetermined sliding time window preceding the current segment, each segment i having length $t_i$ and being retrieved at bitrate $\theta_k$, and with $\mu_{i,j}$ being a measure for a central tendency of the bitrate at which the k-th segments between the i-th and j-th segments, both inclusively, have been retrieved.

9. Retrieving method for retrieving segments of a sequence of segments of an information content from a server so as to be reproduced by a client with varying bitrate, the retrieving method comprising:
determining an oscillation value based on bitrate changes at which recently retrieved segments have been retrieved,
setting a bitrate at which a current segment is to be retrieved depending on the oscillation value,
setting the bitrate in a first manner if the oscillation value is below a predetermined oscillation threshold and in a second manner if the oscillation value exceeds the oscillation threshold,
wherein in the first manner the bitrate is set based on at least one of a buffer fill status of a buffer of the client buffering the sequence of segments and a retrieval throughput at which the sequence of segments is retrieved from the server,
wherein in the second manner the bitrate at which the current segment and the bitrate at which subsequent segments are to be retrieved is set by running sequentially through a low bitrate mode and a high bitrate mode,
wherein in the low bitrate mode the bitrate is set to a first bitrate, and
wherein in the high bitrate mode the bitrate is set to a second bitrate being higher than the first bitrate,
wherein determining the oscillation value is conducted depending on a bitrate change strength.

10. Retrieving method according to claim 9, wherein after reducing the oscillation value by the second manner the bitrate is set by the first manner.

11. Retrieving method according to claim 9, wherein in the second manner a switch from the low bitrate mode to the high bitrate mode is performed at an earlier of
- the buffer fill status exceeding a first predetermined fill level, and
- a time duration of the compensator being in the low bitrate mode exceeding a predetermined time threshold, and
- wherein in the second manner a switch from the high bitrate mode to the low bitrate mode is performed if the buffer fill status falls below a second predetermined fill level.

12. Non-transitory computer-readable medium having stored thereon a computer program having a program code for performing, when running on a computer, a method according to claim 9.

13. Retrieving method according to claim 9, wherein determining the oscillation value is conducted by computing a value for a deviation between a weighted sum of a value of a bitrate change strength at bitrate change events of the varied bitrate at which the recently retrieved segments of the sequence of segments have been retrieved, at immediately following segments of the sequence of segments, without taking the bitrate change direction into account, and the weighted sum of the value of the bitrate change strength at the bitrate change events of the varied bit rate at the immediately following segments of the sequence of segments, with taking the bitrate change direction into account.

14. Non-transitory computer-readable medium having stored thereon a computer program having a program code for performing, when running on a computer, a method according to claim 13.

* * * * *